INTERFACE CONTROL MODULE FOR MODULAR COMPUTER SYSTEM AND PLURAL PERIPHERAL DEVICES

Filed Feb. 14, 1966

12 Sheets-Sheet 1

INVENTOR.
HANS B. MARX

BY Edward J. Feeney Jr.

ATTORNEY

INVENTOR.
HANS B. MARX
BY Edward J. Feeney Jr.
ATTORNEY

INVENTOR.
HANS B. MARX

BY Edward J. Feeney Jr.

ATTORNEY

Dec. 10, 1968 H. B. MARX 3,416,139

INTERFACE CONTROL MODULE FOR MODULAR COMPUTER SYSTEM AND PLURAL PERIPHERAL DEVICES

Filed Feb. 14, 1966 12 Sheets-Sheet 4

INVENTOR
HANS B. MARX

BY Edward J. Feeney Jr.

ATTORNEY

Dec. 10, 1968 H. B. MARX 3,416,139

INTERFACE CONTROL MODULE FOR MODULAR COMPUTER SYSTEM AND PLURAL PERIPHERAL DEVICES

Filed Feb. 14, 1966 12 Sheets-Sheet 5

INVENTOR.
HANS B. MARX

BY Edward J. Feeney Jr.

ATTORNEY

INVENTOR.
HANS B. MARX
BY Edward J. Feeney Jr.
ATTORNEY

Dec. 10, 1968 H. B. MARX 3,416,139
INTERFACE CONTROL MODULE FOR MODULAR COMPUTER SYSTEM
AND PLURAL PERIPHERAL DEVICES
Filed Feb. 14, 1966 12 Sheets-Sheet 7

INVENTOR.
HANS B. MARX
BY Edward J. Feeney Jr.
ATTORNEY

INVENTOR.
HANS B. MARX
BY Edward J. Feeney Jr.
ATTORNEY

INVENTOR
HANS B. MARX
BY Edward J. Feeney Jr.
ATTORNEY

INVENTOR
HANS B. MARX

BY Edward J. [signature] Jr.
ATTORNEY

INVENTOR.
HANS B. MARX
BY Edward J. Feeney Jr.
ATTORNEY

Dec. 10, 1968 H. B. MARX 3,416,139

INTERFACE CONTROL MODULE FOR MODULAR COMPUTER SYSTEM AND PLURAL PERIPHERAL DEVICES

Filed Feb. 14, 1966 12 Sheets-Sheet 12

INVENTOR.
HANS B. MARX
BY Edward J. Feeney Jr.
ATTORNEY 3,416,139

INTERFACE CONTROL MODULE FOR MODULAR COMPUTER SYSTEM AND PLURAL PERIPHERAL DEVICES

Hans B. Marx, Broomall, Pa., assignor to Burroughs Corporation, Detroit, Mich., a corporation of Michigan
Filed Feb. 14, 1966, Ser. No. 527,350
19 Claims. (Cl. 340—172.5)

ABSTRACT OF THE DISCLOSURE

A modular data processing system having pluralities of different functional module types, one of which modules is an interface control module capable of interfacing the computer module(s) of the system not only with a variety of different input/output peripheral devices, but with a variety of memory modules as well. Thus it provides a separate module type to provide interface throughout the system. This interface control module is divided into a first interface means which accomplishes intermodular control and communication within the system and a second interface means which accomplishes control and communication between the system and its input/output peripheral devices.

The present invention relates to modular data processing systems. More particularly, it relates to a ruggedized, extremely small modular data processing system ideally suited for military and industrial applications, especially those requiring mobility.

The large physical dimensions of most previously known modular data processing systems together with their environmental sensitivity and high power demands have limited the well-known advantages of modularity to applications wherein a large physical area was available for the stationary installation of such systems and their permanent connection to the power lines of a utility company. Further, in many cases, the area had to be enclosed and its atmosphere controlled so that the environmental range to which the system was exposed could be maintained within narrow limits. The advantages of modularity, namely, ease of expansion (or contraction), reliability, ease of repair, etc. are especially suitable to military and industrial applications, and particularly where mobility is a requisite.

The present invention provides a novel modular data processing system and therefore possesses all the advantages inherent to modular systems. In addition, it easily satisfies the demanding requirements imposed in military and industrial applications where mobility is desired.

This has been accomplished basically by uniquely combining a plurality of small, highly rugged, functional modules in a new and novel system structure.

Therefore, it is an object of this invention to provide a modular data processing system whose size, weight and structural characteristics uniquely equip it for use in mobile applications especially those requiring a high degree of operational dependability under extreme environmental conditions.

It is also an object of the present invention to provide a modular data processing system having a high degree of modular versatility wherein a plurality of different module types may be freely interchanged.

Another object of this invention is to provide a modular data processing system having a high degree of expandability wherein additional memory capacity as well as peripheral capacity is easily accomplished.

It is also an object of the present invention to provide a modular data processing system having a novel interface control module capable of simultaneously connecting a plurality of functional module types for concurrent communication therebetween.

Another object of this invention is to provide a modular data processing system having a plurality of central data processing modules (CDP) capable of concurrently computing a plurality of programs wherein the timing means of each of the processing modules is phase locked to the others in an out of phase relationship to reduce the possibility of simultaneous requests by a plurality of the processing modules for the services of a particular memory module.

It is also an object of the present invention to provide a modular data processing system capable of readily utilizing a plurality of different memory modules having different types of storage elements.

Another object of the present invention is to provide a modular data processing system having a plurality of control modules, each concurrently capable of providing interfacing between the system memory modules and all other modules in the system and further each individually capable of providing interfacing between the system and its peripheral devices to provide a system capable of accommodating a plurality of types of peripheral devices and a plurality of types of memory modules.

It is also an object of the present invention to provide a truly modular system capable of processing a plurality of programs simultaneously by having a plurality of central processing modules concurrently communicating with a pluality of memory modules through a plurality of module interface control units.

Briefly then, the present invention provides a highly mobile, extremely rugged modular data processing system. Moreover, it does not require any special transportation or housing facilities. On the contrary, it is capable of operating under a wide range of extreme environmental conditions in its present configuration without cover of any kind.

It should be noted here that a number of separate patent applications assigned to the same assignee are being co-filed herewith. They are directed at each of the individual functional module types of this system and cover separate novel features respectively included therein and the contents of each of these separate patent applications is incorporated into this application by this reference. They are entitled: "Memory System," by Ronald W. Hatton et al., Ser. No. 527,360, filed Feb. 14, 1966; "Input/Output Control System for Electronic Computers," by Hans B. Marx et al., Ser. No. 527,322, filed Feb. 14, 1966; "Central Data Processor," by Hans B. Marx et al., Ser. No. 527,374, filed Feb. 14, 1966; and "Central Data Processor for Computer System Having A Divided Memory," by Hans B. Marx et al., Ser. No. 527,123, filed Feb. 14, 1966; and "Power Supply System," by Albert P. Fegley, Ser. No. 527,841, filed Feb. 16, 1966.

Other objects and features of the present invention will become apparent upon careful consideration of the following detailed description when taken together with the accompanying drawings.

Before starting the detailed description of this system invention it is important to repeat that a group of separate patient applications have been co-filed herewith which are respectively directed at each of the functional system modules herein illustrated and described and the contents of each of those applications is incorporated into this application to provide specific details of various portions of the present overall system.

In view of the fact that the present application is directed toward a system combination of modules which are independently disclosed it is believed unnecessary to reiterate the contents of each of these co-filed applications. For example, a system such as is disclosed herein would include at least one central data processor and at least one memory module. The central data processor used may be the one disclosed in the co-filed application entitled "Central Data Processor" by Hans B. Marx et al., Ser. No. 527,374, filed Feb. 14, 1966. Alternately, a somewhat similar central processor module which could also be used is disclosed in another co-filed application entitled "Central Data Processor for Computer System Having A Divided Memory" by Hans B. Marx et al., Ser. No. 527,123, also filed Feb. 14. 1966.

The memory module used would be one such as is disclosed in the co-filed application previously noted entitled "Memory System" by Ronald W. Hatton et al., while the interface control module used would be that disclosed in the co-filed application noted above entitled "Input/Output Control System for Electronic Computers" by Hans B. Marx et al.

Further a preferred power supply for the system would be that disclosed in the co-filed application previously noted entitled "Power Supply System" by Albert P. Fegley.

Figure 1:
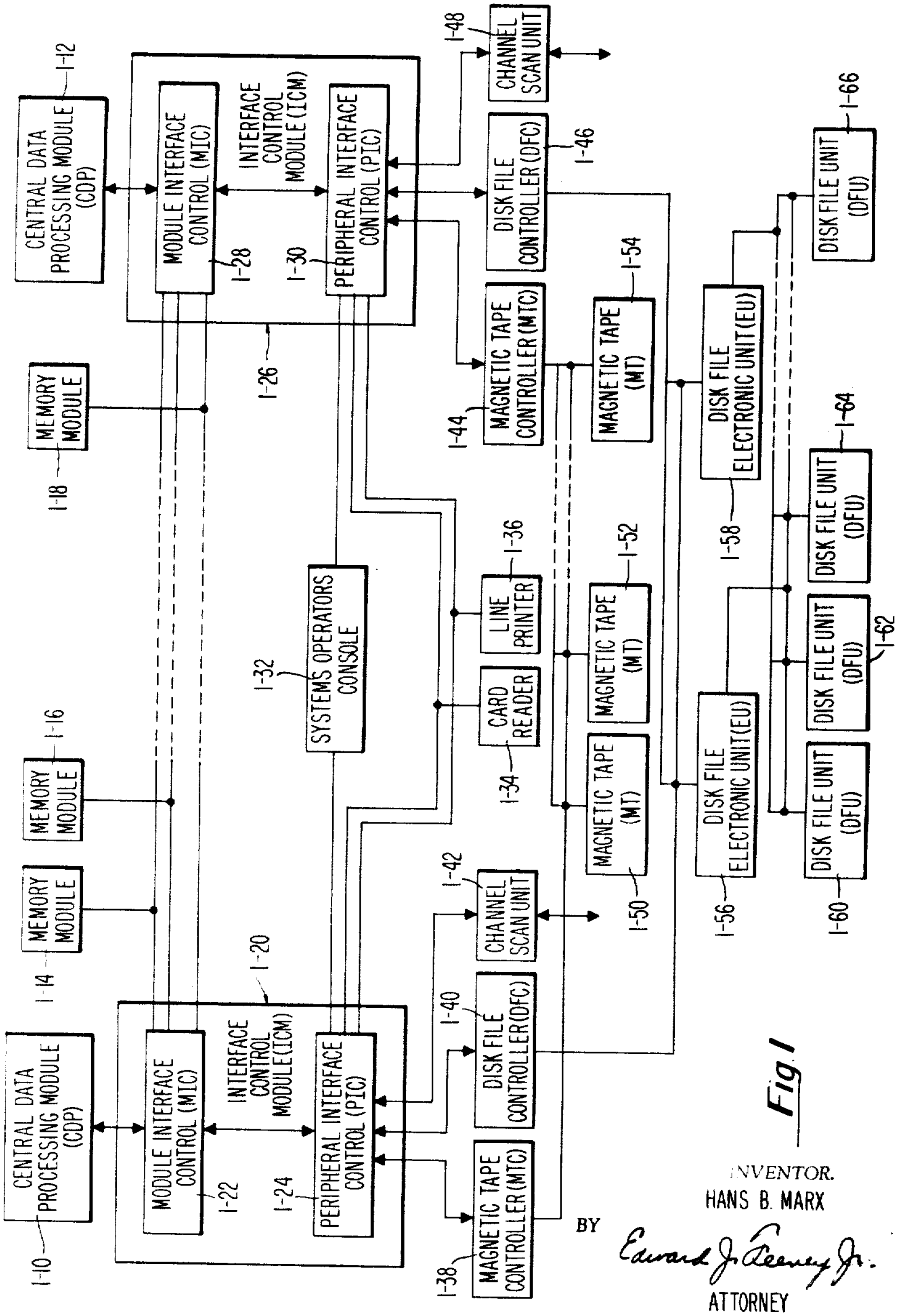
FIGURE 1 is a modular block diagram of a typical data processing system incorporating the novel concepts disclosed herein.

The interconnection of these noted modules would be as specified in FIGURE 1 of this application and the details of such interconnection from the information presently given is considered so apparent as to be obvious to those skilled in the art of designing and constructing data processing systems.

Finally the operation of the system is best understood by considering the operation of each of the above cited modules with special notice being taken of the operation of the central data processing module of the above referenced applications.

Referring to FIGURE 1, in particular, there is shown a complete block diagram of a preferred configuration of the invention. A first and a second central data processing module (CDP) 1–10 and 1–12 are shown in the upper left and right hand corners, respectively. Each CDP is connected for bidirectional memory communication to interface control modules (ICM) 1–20 and 1–26 respectively. A representative plurality of memory modules 1–14, 1–16 and 1–18 are illustrated between the two central data processors. They are individually connected to both of the interface control modules 1–20, 1–26. A plurality of peripheral devices, namely, a systems operators console 1–32, a card reader 1–34 and a line printer 1–36 are similarly connected to both of the interface control modules. However, it should be noted that these peripheral devices are respectively connected to the peripheral interface control means (PIC) 1–24 and 1–30 of the interface control modules, whereas the memory modules 1–14, 1–16 and 1–18 are connected to the module interface control means (MIC) 1–22, 1–28. Also connected to the peripheral interface control means 1–24 and 1–30 are magnetic tape controllers (MTC) 1–38, 1–44, disc file controllers (DFC) 1–40, 1–46 and channel scan units 1–42, 1–48. The magnetic tape controllers 1–38, 1–44 are commonly connected together to a plurality of magnetic tape units 1–50, 1–52 and 1–54.

The disc file controllers 1–40, 1–46 are similarly connected together to a plurality of disc file devices, each of which includes an electronics unit 1–56, 1–58. The electronics units, 1–56 and 1–58 in turn, are connected to share the four storage disc files, 1–60, 1–62, 1–64 and 1–66. The present configuration permits not only greater flexibility but increased efficiency as well.

Figure 2:
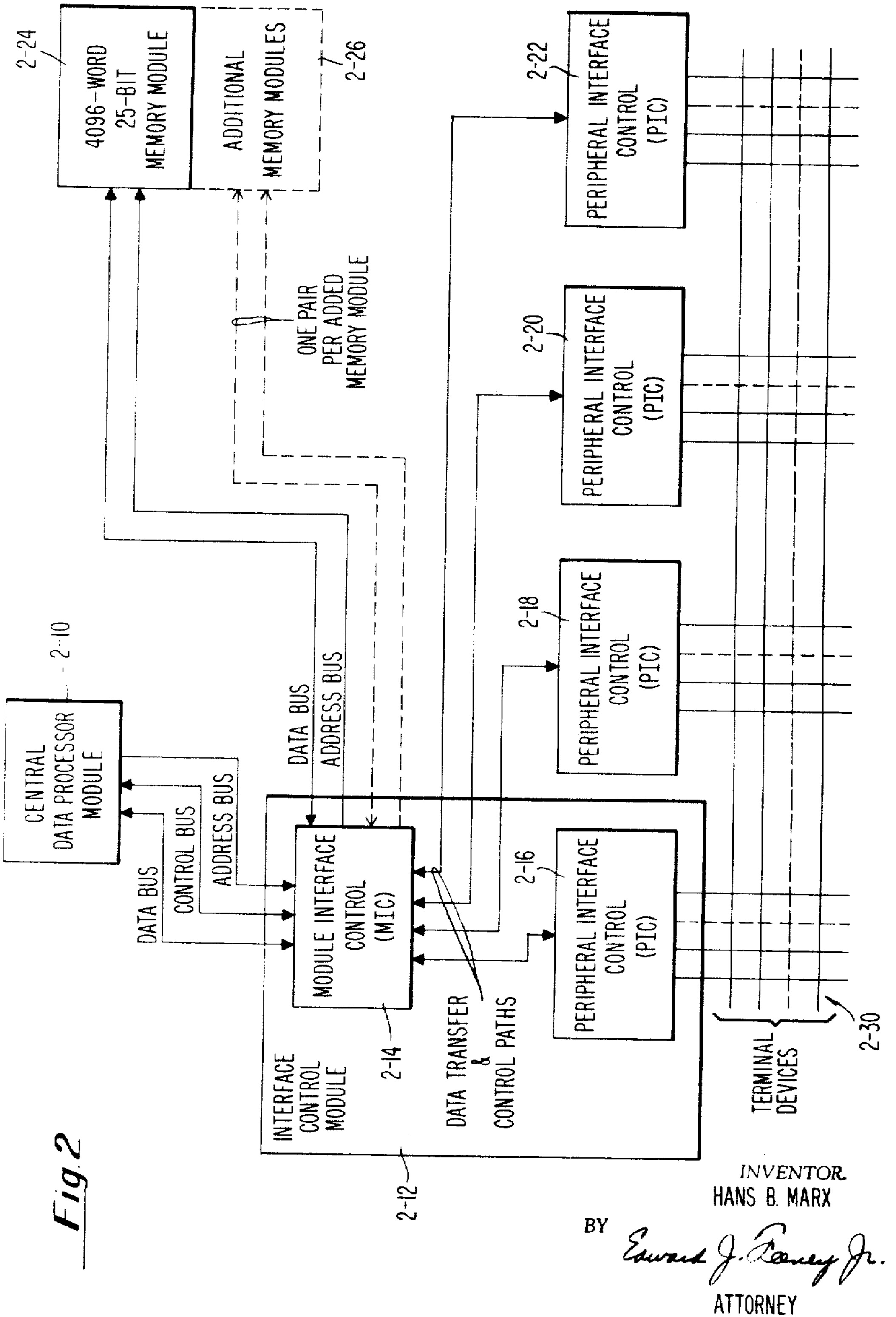
FIGURE 2 is a block diagram of a smaller version of the inventive system illustrating its additional data transfer and control paths.

FIGURE 2 is a simplified configuration of a smaller version of the present invention illustrating the modular interconnecting line functions and indicating their respective signal flow directions. A single central data processor module 2–10 is shown interconnected to interface control module 2–12 by a data bus, a control bus, and an address bus. The former two busses are capable of bidirectional operation, while the latter bus is unidirectional. This latter bus carries the memory address from the processor module (CDP) 2–10 to the module interface control means 2–14 of the interface control module 2–12. A similarly unidirectional address bus is individually connected from the module interface control means (MIC) 2–14 to each of memory modules utilized 2–24, 2–26 in the system. The representative memory expansion indicated by the dashed line in FIGURE 1 between memory modules 1–16 and 1–18 is correspondingly represented by the dashed memory module 2–26 in FIGURE 2. In both cases, it may be enlarged to encompass as many as eight memory modules of 4096 twenty-five bit words each.

A corresponding bidirectional data bus is also connected to each memory module 2–24, 2–26 from each MIC, 2–14, as is a unidirectional address bus.

FIGURE 2 is notable for its illustration of the expandable, external peripheral concept, also referred to herein as external channel control capability. This feature involves the use of additional interface control (PIC) units 2–18, 2–20, 2–22 which may be externally utilized in addition to the internal interface control unit 2–16 shown. With this feature the system input/output control portions has considerably increased peripheral power in that it is not limited by the capacity of the internal peripheral interface control 2–16.

As previously noted, FIGURE 2 is a block diagram of a small version computing system illustrating the interrelationships among the several modules. Although not shown in this figure, the central data processor (CDP) 2–10 includes generally two functional areas: the arithmetic unit and the program execution control portion. The program execution control includes the memory addressing control, the interrupt logic control, and control logic for data transfers between the CDP and interface control modules. There is no complete separation between the arithmetic unit and the control portion since many logic blocks are shared by the two functional units to increase the overall efficiency. Although the number of memory and interface control modules are determined by the specific application, no changes are required in the design of the central data processing module.

The module interface control (MIC) portion 2–14 of the interface control module (ICM) 2–12 controls the flow of data between the CDP 2–10 the memory modules 2–24, 2–26 and the peripheral interface control (PIC) 2–16, portion. The MIC includes three functional sections with the third functional section being included only in larger configurations: (1) data routing control, (2) program interrupt control, and (3) memory and peripheral data bus allocation. The inclusion of a module interface control (MIC) permits concurrent memory access by peripheral channels 2–16, 2–18, 2–20, 2–22 and the CDP 2–10. It also provides for multiprocessing configurations.

All inputs and outputs to the computer system are via the peripheral interface control (PIC) 2–16, etc., the interface control module. The number and type of peripheral control means used in a given configuration is determined by the specific application and the peripheral equipment employed. They may be general purpose, or special purpose.

A general purpose peripheral interface control (PIC) has a number of buffered and unbuffered channels. A buffered I/O channel operates with a buffer store which is part of the system memory. However, an unbuffered channel operates directly under complete program control, and each data transfer requires a programmed instruction. Such transfers may be either to or from memory. They may also be to or from an arithmetic register. The programmer decides and selects the desired mix of buffered and unbuffered channels in the PIC. He makes the initial buffer store assignment, specifying location and buffer size and gives the buffered channel a "go ahead" command. Further structural information and operation details of the I/O module are given in the co-pending application U.S. S.N. 527,322, by Hans B. Marx previously referred to in this application. However, generally, various MIC configurations are required by various memory system requirements. In addition special purpose PIC's are required when a particular or unique peripheral device is required by the customer or user. The number of channels that can be included in one PIC is determined by the desired mix of buffered and unbuffered I/O data transfers. Special purpose PIC's include communication interface control, disc file controllers, magnetic tape controllers, and any other special interface required. The PIC 2–16 interfaces with the CDP, 2–10 and the memory modules 2–24 via the interface control module (MIC). Data transfers between the memory and input/output may be by memory cycle sharing or by concurrent memory access, depending on the MIC configuration. The PIC being designed for a specific application, permits a highly flexible design in that only as many circuits as are needed are actually built into the unit. This also permits the addition of further I/O capabilities, thus providing essential growth capability.

The basic memory modules 2–24, 2–26 each have a storage capacity of 4096 words of 24 bits plus parity. The modular design of the present system requires that it be capable of operating effectively and efficiently with broadly expansible memory complements. Hence, the CDP 2–10 is designed for operation in systems having different memory sizes and configurations without requiring corresponding changes in its logic. This is made possible through the modular addressing scheme utilized by the system and hereinafter described in greater detail.

The system can operate with one or more basic memory modules. The memory configuration may be homogeneous or heterogenous. If a homogeneous memory is used, the maximum memory size compatible with the system shown is eight basic memory modules of 4096 words each. However, for a heterogeneous memory configuration, the memory size can be expanded further. Examples of heterogeneous and homogeneous memories suitable for use in this invention are set forth in co-pending applications U.S. S.N. 527,123 and 527,374 previously referred to. In addition, the structure necessary to accommodate various memory configurations is specifically set forth in the figures and the description of U.S. S.N. 527,374. Generally, however, the present system is limited to eight homogeneous modules merely because of the number of bits set aside for the module selection is fixed by the number of binary combinations. For example, a group of 12 address bits limit the number of addresses to be selected to $2^{12}$ of 4096 selections. Naturally it is almost always desirable to have an increased storage capability and consequently expanded storage possibilities are desirable. Additional information regarding this storage feature is given later in this application.

Figure 7:
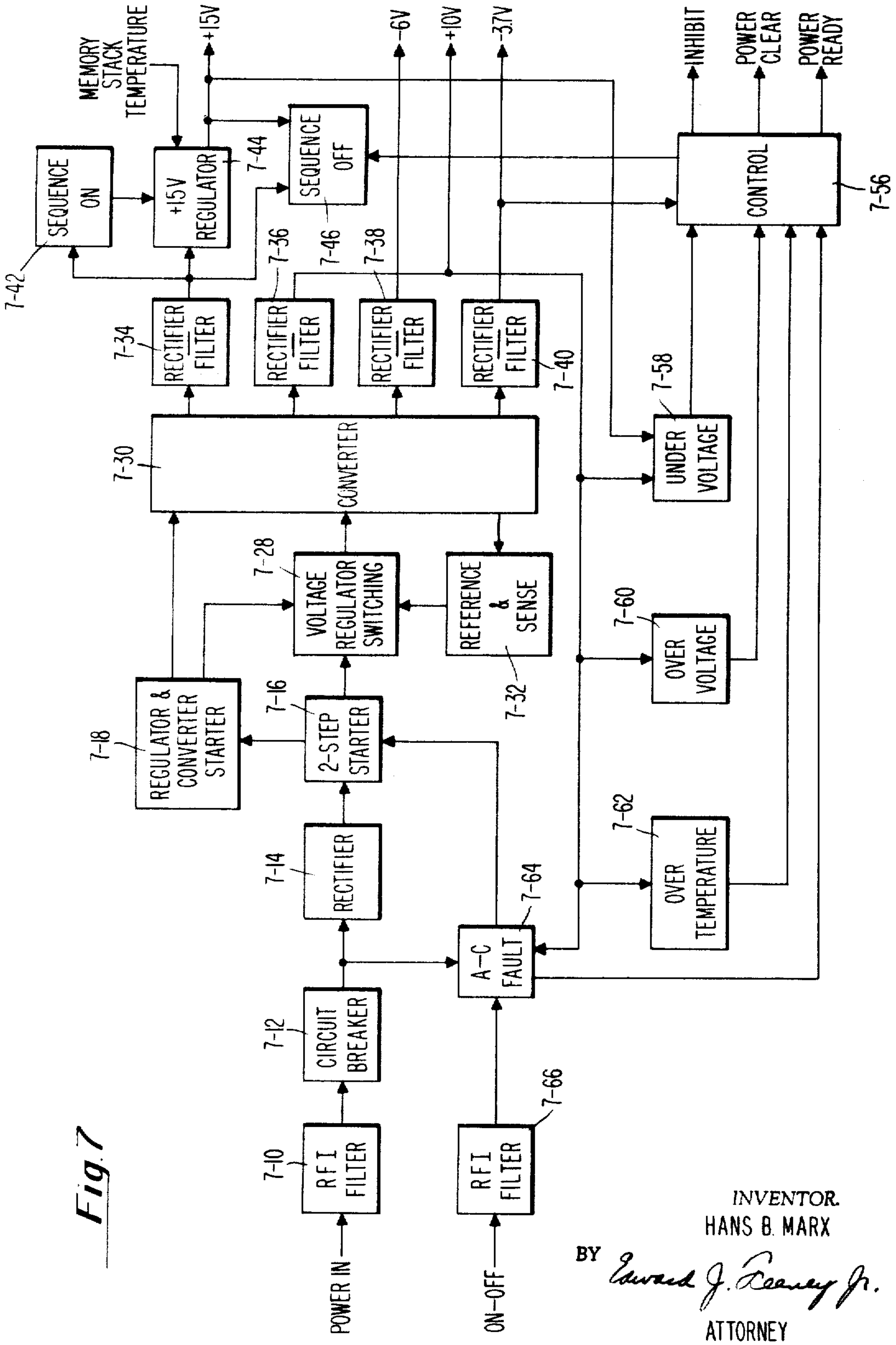
FIGURE 7 is a detailed block diagram of the power supply module used in the system.

The power supply design although not shown in FIGURE 2, is illustrated in detail in FIGURE 7. It stresses reliability, efficiency and compact size. Only one regulator and one converter is required per system, hence the number of components is kept to a minimum. No input transformer is needed, and all electromechanical components are eliminated with the exception of a single circuit breaker which is also used for a power ON–OFF switch.

Figure 3:
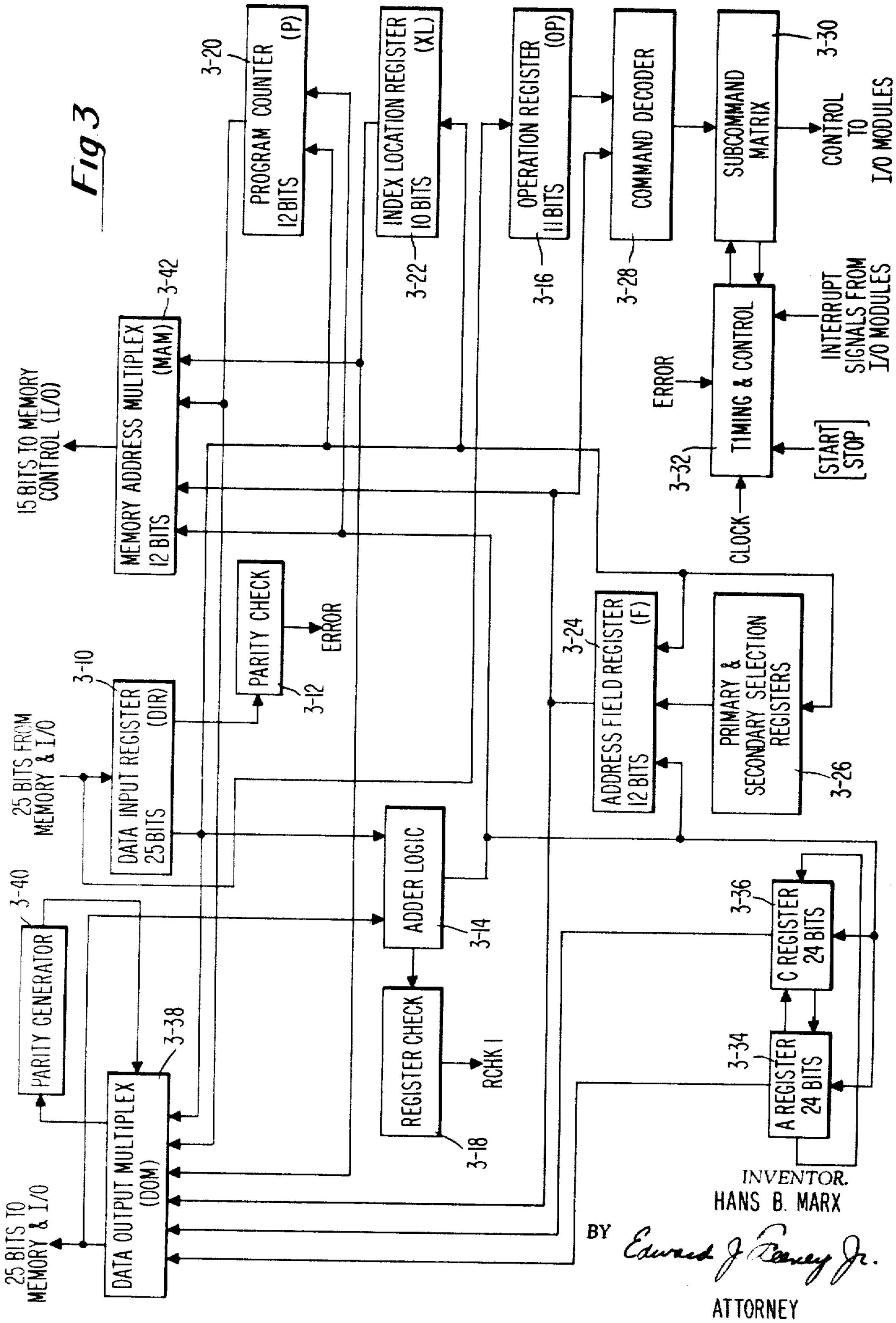
FIGURE 3 is a more detailed block diagram illustrating the central data processing module of the system.

The central data processor (CDP) module of the computer system is shown in FIGURE 3. As previously noted, it includes two functional areas, the arithmetic unit and the program execution control. It is immediately apparent from the figure, however, that there is no complete separation between the two functional areas of the CDP. Many logic blocks are shared, thus achieving efficient design. Additional information regarding this shared logic feature of CDP module is set forth in both of the applications specifically and solely directed at a full disclosure of CDP modules. Each module may be used in this system. They are patent applications U.S. S.N. 527,123 and U.S. S.N. 527,374.

For example, it is noted here that the address register 3–24 of FIG. 3 is also used as a counter and this feature is set forth more explicitly in application U.S. S.N. 527,374. It is, of course, obvious that where logic circuitry is utilized to perform a pair of operations which formerly required separate circuits that the efficiency of the module featuring shared logic is increased over former modules featuring separate circuitry.

The arithmetic unit includes the two arithmetic registers, A 3–34 and C 3–36, a 23-bit parallel adder 3–14, the data input register (DIR) 3–10 and the data output multiplex (DOM) 3–38. All data (including instruction words) entering the CDP enter via the DIR 3–10. All data leaving the CDP are transferred out via the DOM 3–38. The 23-bit parallel adder 3–14 is normally used for adding two numbers, one from DOM 3–38 and the other from DIR 3–10. The adder is also used for logical operations, and furnishes a transfer path between DIR 3–10 or DCM 3–38 and the registers 3–34 and 3–36 in the arithmetic unit and those in the program execution control area.

The A-register 3–34 contains 24-bits, allowing the register to handle either a data word of 23-bit magnitude plus sign, or a 24-bit logical word. It may hold one of the operands in arithmetic and logical operations. However, if specified by the command, the A register will hold the augend at the start of an addition.

The program execution control functional area of the CDP is generally shown on the right of FIGURE 3. It includes logic necessary for command decoding 3–38 and subcommand generation 3–30 and for transferring addresses to the memory module through the memory address multiplex 3–42. Instructions read from memory are transferred from DIR 3–10 to the operation register 3–16 and the address field register 3–24. If address modification or indirect addressing is indicated, the appropriate address is transferred to the memory module via the memory module selection logic registers 3–26 and the memory address multiplex 3–42. The selection logic 3–26 determines the memory module to which the address refers. The multiplex 3–42 handles 12-bits of address required to select a word location within a 4096 word module.

Each of the system memory modules house an index register. Their addresses are made up of bits of the index location register 3–22 and the two indexing bits of the instruction word. The three most significant bits of the index location register 3–22 determine the memory module in which the index register is located and its ten least significant bits make up the base address within the memory module. The indexing bits of the instruction word make up the two least significant bits of the address in the index location register.

The index location register 3–16 is also used to hold one of the addresses during two-address block operations. In this configuration only its nine most significant bits are used. The three most significant bits determine the memory module as above, with the next six bits specifyin the base address; the six least significant bits of the address field register 3–24 complete the address.

The address field register 3–24 is a 12-bit register used to hold a data address or an indirect address. In addition, the bits in this register are used for command modifications of those instructions that do not require the fetching of data from memory. It also temporarily holds the descriptor word during the execution of the descriptor transfer command and its six least significant bit locations are used as a counter to provide the 64 ($2^6$) sequential address variants for block operations. Since the counter is specified as a six bit counter, the maximum number of variations possible is set at 2 raised to the 6th power or 64 possible address variants. An increased number of variants is possible where the size of the counter is increased.

An expanded discussion of these variants for block operations is set forth in the previously referred to patent application Ser. No. 527,374.

The program counter 3–20 is a 15 bit register. It is used to sequentially step the program and to address the memory fetching instruction words. Normally, the program counter 3–20 is stepped by "one" after a program step has been transferred from the memory. However, this procedure may be modified and the programmer has several commands available for changing this program sequence. This program counter is shown in FIG. 3 as a 12 bit counter and corresponds to the counter used in the CDP module set forth in patent application Ser. No. 527,123. However a somewhat modified CDP is set forth in the co-pending application Ser. No. 527,374. In this latter CDP, this counter 3–20 is specified as a 15 bit counter and branch operations permit changing the 12 least significant bits contained in the program counter by transferring the 12 bit content of the address field register to the program counter register without disturbing its three most significant bits or all 15 bits of the program counter 3–20 may be changed if indirect addressing or indexing has been specified. The program counter register may also be preset by the content of a specified memory location.

Figure 4:
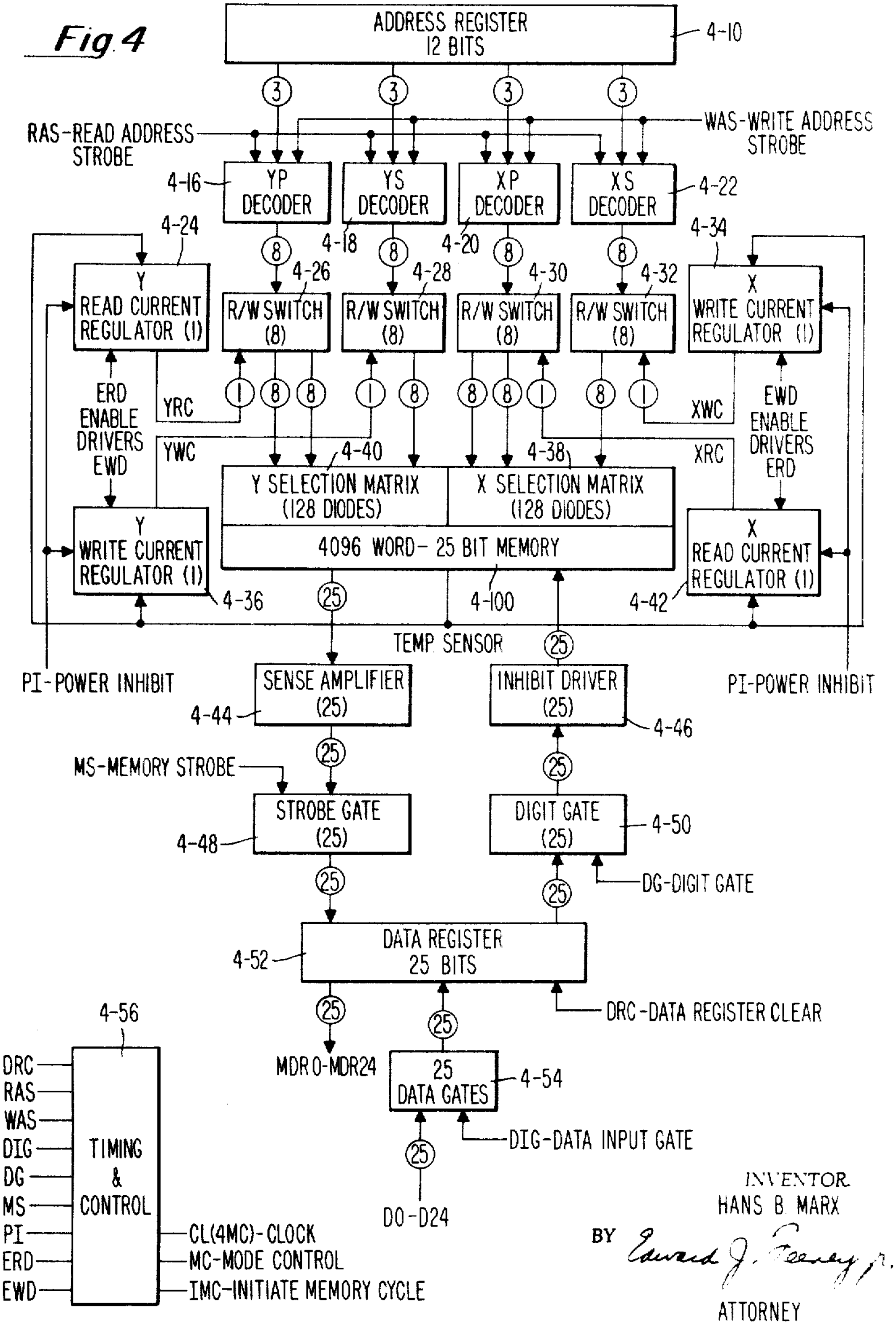
FIGURE 4 is a similar block diagram of the memory module used in a preferred system configuration.

The central data processing module operates by executing the program stored in the memory modules. A representative block diagram of a memory module is shown in FIGURE 4. A program is comprised of a plurality of instructions stored in ascending locations in the module. They are sequentially taken from these locations as ordered by the program control, by an external interrupt, or by an error interrupt. Three basic commands are available to the programmer for altering the execution sequence under program control. They are: (1) unconditional branch, (2) conditional branch, and (3) "load the P counter from a memory location." The sequence followed by the program may be predetermined or determined by tests, executed under program command and applied at specified points in the execution sequence. For example, a test resulting in the setting of a jump control bit may be specified as a condition for the execution of a conditional branch. This provides program control over the program execution sequence and permits the repeating of sub-sequences in the program. The stored program is loaded into the system memory from tape. A program may be completely replaced by loading a new program into the memory or it may be altered by replacing the content of any of the memory locations comprising the program store.

The basic instruction cycle for the system requires four microseconds. Any number of pulse times (one-microsecond periods) may be added to the basic four microsecond instruction cycle to obtain the numbr of pulse times required to execute a given command. This basic instruction cycle includes the time required for fetching data from memory, executing the operation, and fetching the next program step from the program store. Address field modification adds a memory cycle to the basic cycle each time the address field is modified. Similarly, a memory cycle is added for each indirect address.

Returning to the description of the memory module shown in FIGURE 4, a 12 bit address is required to provide word selection of one of the 4096 memory locations included in the memory stack 4–100. The desired 12 bit address is transmitted to the selected memory module from an address register 4–10, which is part of the module interface control 2–12 shown in FIGURE 2. Three of the twelve bits recived from this register 4–10 are coupled to the Y prefix (YP) decoder array 4–16, while three more are presented to the Y suffix (YS) decoder array 4–18. This arrangement provides for the selection of one of the sixty-four Y drive lines by selective activation of the sixteen read/write switches 4–26 and 4–28. Similarly, the remaining six bits from the address register 4–10 are coupled to a corresponding pair of X decoders, i.e., XP 4–20 and XS 4–22 and to the sixteen R/W switches 4–30 and 4–32 to select one of the sixty-four X drive lines. In this way, a selection of a word among the 4096 word locations is accomplished.

When the address selection is completed, the current regulators supplying the X and Y read currents 4–42 and 4–24 respectively, are enabled. These storage elements at the intersections of the selected drive lines which presently contain a binary ONE are switched to the binary ZERO state. In the present configuration these elements are magnetic cores, however, it is to be understood that other storage elements such as thin films, bistable devices, etc., are equally suitable and provide corresponding operation. This switching of the storage elements generates output signals which are sensed and amplified by the sense amplifiers 4–44. Finally, these amplified signals are passed through the strobe gates 4–48 by the application of a memory strobe signal (MS) and into the data register 4–52 for delivery to and use by the system.

If the memory operation is a read/restore operation, the information leaving the data register 4–52 is simultaneously re-entered in the memory stack 4–100.

This re-entry of information is accomplished by first applying an inhibit current through the inhibit drivers 4–46 to those elements in the memory stack location which are to remain in the binary ZERO state.

Enabling signals EWD are then applied to the X and Y write current regulators 4–34 and 4–26 to cause a binary ONE to be stored in the remaining elemental portions.

Where the clear/write mode of operation is specified external information enters the data gates 4–54 after a clear signal (DRC) is applied to the data register 4–52.

The timing and control means 4–56 in the lower left hand corner of the figure provides the gating and enabling signals required as well as the strobe and clear signals aforementioned. A memory cycle is initiated, timed and its mode specified by the application of appropriate signals to the timing and control means 4–56.

Figure 5:
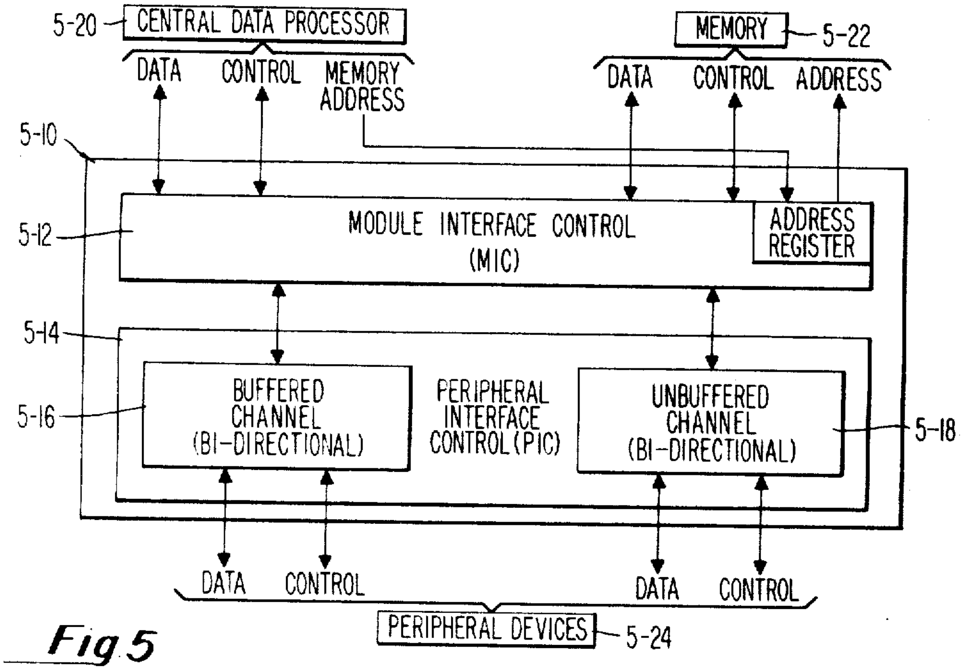
FIGURE 5 is a general block diagram of the basic interface control module used in the present system illustrating the module interface control portion and the peripheral interface control portion.

FIGURE 5 illustrates generally the interface control module 5–10 with its module interface control (MIC) 5–12 and its peripheral interface control (PIC) 5–14. A trio of intercommunicating cables, namely, data, control and memory address, are shown connecting the central data processor 5–12. A similar trio connects the memory 5–22 to the same control 5–12.

The module interface control 5–12, in turn, is connected for bidirectional communication with the peripheral interface control (PIC) 5–14. This bidirectional connection is accomplished to both the buffered channel 5–16 and the unbuffered channel 5–18 of the PIC 5–14.

Both buffered and unbuffered channel types are respectively connected with data and control cables to appropriate peripheral devices 5–24.

It should be noted that where the preferred system configuration is sufficiently large, the MIC portion 5–12 of the module 5–10 correspondingly increases until it occupies the entire module. In this event the control of the input/output devices or as it is called hereinabove, the PIC portion 5–14, is similarly placed in a separate I/O module.

Figure 6:
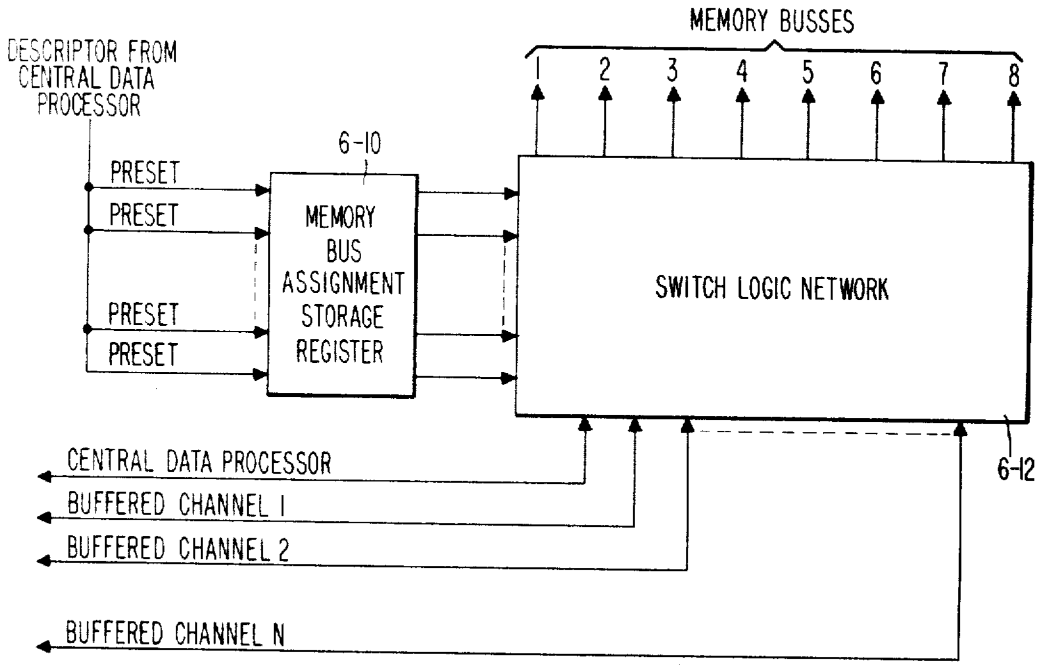
FIGURE 6 is a more detailed illustration of the basic interface control module shown in FIGURE 5.

The module interface control MIC also includes the memory and I/O bus allocation logic for computer systems requiring concurrent memory access and for multiprocessing configurations. A more detailed configuration of the module interface control (MIC) is shown in FIGURE 6. Dominating the figure is the logical switching network 6–12 which receives the memory bus assignment from the storage register 6–10. No additional structure of the logical switching network 6–12 is believed necessary since such a network is believed well known to those skilled in the data processing art. For example, in any modular system wherein modules are selectively interconnected one to another, there will exist a network having a plurality of logical transfer gates which are used to selectively couple the modules together for intercommunication therebetween. For example, a logical network such as that disclosed in the Lynch U.S. Patent No. 3,302,182 assigned to the present assignee, would appear to be satisfactory. Still further as previously noted, a separate patent application U.S. Ser. No. 527,322 by H. Marx et al., is directed to the I/O module used by this system. It includes this logical switching network and should more than satisfy any additional structural requirement necessary to this disclosure. This information is in descriptor or instruction form and is received earlier as a descriptor from the central data processing module. Consequently, these lines are denoted as being preset. In response to this assignment, the network 6–12 logically switches one of the eight memory busses to one of *n* buffered I/O channels or to the central data processor. Since as previously mentioned, concurrent memory access is possible the remaining memory busses may be simultaneously connected in a similar manner to either another central data processor or to another one of the *n* buffered channels. In summary, the MIC receives data, memory addresses and control signals from the CDP, the I/O modules, and the memory, and distributes data, addresses, and controls to these modules. Data and control words from the CDP are received via a 25-bit data bus (including a parity bit) which is the output from the data output multiplex (DOM) in the CDP. These data and control words are then routed to the appropriate transfer paths or controls as determined by the associated control signals. Address words received from the CDP are routed directly to the memory if no concurrent access is implemented. Otherwise the address and the memory read or write requests are routed to the bus allocation logic. Similarly, data and addresses received from the I/O module are transferred to the CDP input multiplex or the bus allocation logic. Data coming from the memory or routed to the CDP input multiplex or to the specified I/O channel.

FIGURE 7 illustrates the power supply module utilized by the present system in block diagram form. The power supply here described supplies the operating voltages for the preferred system configuration disclosed in the present embodiment. Its efficiency is approximately 80% and it includes many notable features. Among these are: a high speed fault detection system together with a corresponding group of protective circuits; a converter means which provides all of the necessary output voltages; a single voltage regulator for the converter; a memory information protection system in the event of a primary power failure; no input power transformer; a single temperature variable output for memory, no forced air cooling required; and ready repair accessibility.

The 80% power system efficiency is achieved by using a single high voltage switching type regulator rather than several low voltage regulators. The extreme compactness is gotten by the lack of an input power transformer and the use of a high frequency D.C. to D.C. converter.

In the figure, the input power is first filtered 7–10, connected through a circuit breaker 7–12, rectified 7–14 and passed to a two step starter and converter drive circuit 7–16. A series regulator 7–28 controls the input voltage to the converter 7–30. The output of the converter 7–30 is connected to a reference and sense circuit 7–32 which provides the voltage regulator 7–28 with a reference level and the control signals necessary to compensate the regulator. A plurality of rectifier and filter circuits 7–34, 7–36, 7–38 and 7–40 simultaneously receive the output of the converter circuit 7–30 to provide the specified D.C. outputs to the computer circuits.

A temperature controlled series regulator 7–44 gives the temperature variable 15 volt supply whose variation is dependent upon the memory stack temperature.

Power sequencing is accomplished both in the turn-on 7–42 and the turn-off 7–46 process. Protection is provided in both cases, since the components as well as the storage information contained in the memory are preserved against unintentional damage or loss.

A control means 7–56 is responsive to over 7–60 and under 7–58 voltage variations and to excessive temperature excursions 7–62 to provide inhibit signals as well as clear and ready indications of power conditions.

The previously mentioned A.C. fault circuitry 7–64 is also operative upon the control means 7–56 to provide similar control signals.

Figure 8:
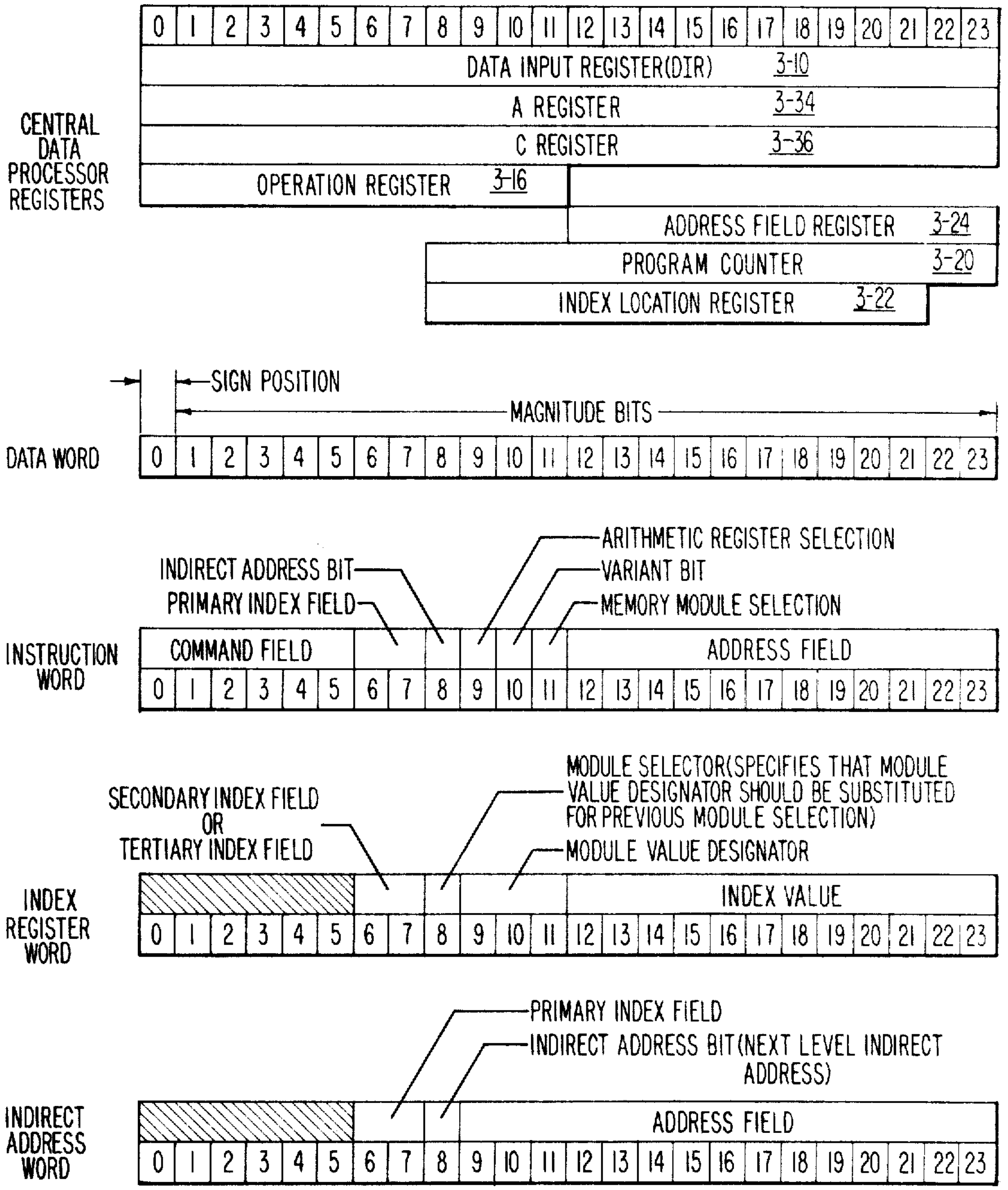
FIGURE 8 illustrates the format and register bit configuration of the central data processor.

Four types of words are used in the central data processing module. They are: (1) data words (2) instruction words, (3) index register and (4) indirect address words. Since the system permits the use of a homogeneous memory configuration, the four types of words are not restricted to any particular memory module but may be stored anywhere in memory. The upper portion of FIGURE 8 shows the bit position alignment of the various registers in the CDP, with their corresponding reference numerals as shown in FIGURE 3. Note that the instruction word indexing bits are used directly out of the data input register (DIR) and therefore are not transferred to any of the other registers in the central data processing module. It is also noted that although the registers are illustrated as having 24 bits that a parity bit is associated with each 24 bit word. Thus, the data input register (DIR) 3–10, the A register 3–34 and the C register 3–36 are 24 bit registers corresponding to a single word length. The operation register 3–16 however is a 12 bit register covering bits 0 to 11 of the 24 bit word length. The address field register 3–24 is also a 12 bit register but it corresponds to the latter 12 bits of the system word, namely, bits 12 to 23.

The program counter 3–20 is a 16 bit register which includes bits 8 to 23 of the system word, while the index location register 3–22 is a 14 bit register covering the same range of bits as the counter 3–20 with the exception of the last two bits. Consequently, the index location register 3–22 covers the bits 8 to 21 of the word length.

The word formats of the four types of words are illustrated in the FIGURE 8 portion immediately below the central data processor registers. They will be discussed in the order of their appearance. The data word includes in its first bit position the sign of the value contained in the remaining 23 bits. Thus, the magnitude of the numerical value is included in bit positions 1 to 23 with the plus or minus notation accompanying the numerical values indicated in bit position 0.

The instruction word comprises in general, the command, address and selection bits used by the system. Bits positions 0, 1, 2, 3, 4 and 5 store the 6 bit command field, while bits 6 and 7 house the primary index field.

An indirect address bit and a variant bit are located in bit positions 8 and 10, while an arithmetic register selection bit and a memory module selection bit are respectively stored in bit positions 9 and 11.

The address field is a 12 bit group covering bits 12 to 23 of the instruction word. These twelve bits correspond to the bits designated in the address field register 3–24 shown in the upper portion of the figure.

The index register word is the third word type and includes a 12 bit index value in bit locations 12 to 24. Bit 8 together with bits 9, 10, and 11 provide a novel innovation in that bit 8 is used to specify that the module value presently designated in bits 9, 10 and 11 be substiutted for the module previously selected.

Bits 6 and 7 denote the secondary (or tertiary) index field. This field specifies the secondary (or tertiary) register to be used for the operation. Shaded bits 1 to 5 inclusive are not used in this word.

Finally, the format of the indirect address word is illustrated at the bottom of the FIGURE 8. Bits 6 and 7 of this word are now the primary index field although they are not actually the primary field itself but rather they specify the register wherein it is located. Bit 8 in the indirect address word is specified the indirect address bit and denotes the next level indirect address. The fifteen bits (9 to 23 inclusive), as indicated denote the address field and shaded bits 1–5 again indicate non-use of these bits.

Figure 9:
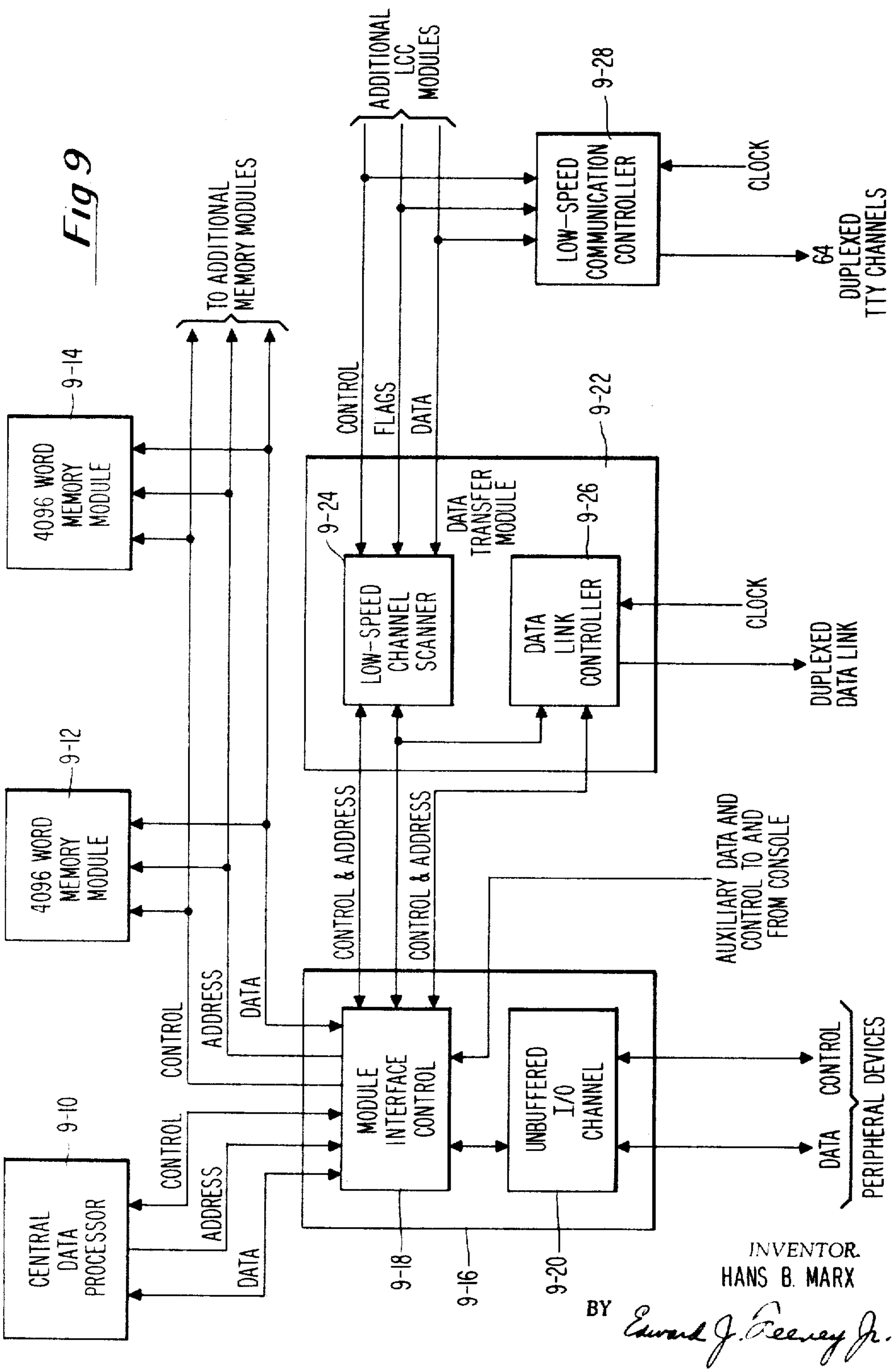
FIGURE 9 is a second embodiment of the present invention, showing a different input-output control configuration.

A second systems configuration is shown generally in FIG. 9. The basic system illustrated includes two memory modules, providing 8,192 words of storage with an expansion capability to 16,384 words of memory. A data transfer module 9–22 is utilized in conjunction with an interface control module 9–16 in a manner similar to the interconnection of the interface control module 2–12 and the peripheral interface control 2–18 shown in FIGURE 2. However, the data transfer module 9–22 contains a low speed channel scanner 9–24 which is capable of servicing 256 low speed duplexed teletype (TTY) channels. A low speed communicating controller 9–28 is parallel connected to the scanner 9–24. It accommodates 64 duplexed TTY channels, divided into two groups of 32 duplexed channels each. Only one group may be implemented. The data transfer module 9–22 also contains a data link controller 9–26. This controller 9–26 services a duplexed data link operating at 1.2 kc., 2.4 kc., or 4.8 kc. and it includes the necessary logical circuitry for error checking. The peripheral devices associated with this system are a printer, a tape reader used for loading programs, and an operators' console. These devices are serviced via an unbuffered channel 9–20 which is part of the interface control module 9–16. The unbuffered channel 9–20 includes the controller logic for the peripheral devices, namely, the printer and tape unit.

The interface control module 9–16 contains two submodules: (1) the module interface control 9–18 and (2) the unbuffered I/O channel 9–20. Space is also available in the interface control module to add the special test logic (STL) to permit the execution of a diagnostic program.

The module interface control (MIC) 9–18 controls the data flow between the memory modules 9–12, 9–14; the input and output peripheral devices and the central data processing module (CDP), 9–10. The previously referred to patent application, U.S. S.N. 527,322 directed toward the I/O module, or as it is called herein, the interface control module, specifies in detail the operation of the MIC and reference to that application should amply provide any additional information required regarding its operation and control. In addition to this main function the MIC, 9–18 provides a number of well known auxiliary functions such as maintenance console interface, bootstrap and other special controls required during maintenance and troubleshooting of the system. The MIC 9–18 receives memory addresses from the CDP 9–10 and transfers them to the memory modules 9–12, 9–14. Similarly, it receives addresses from the peripheral devices for transfer to the memory modules. Conversely, it routs the data received from the memory to the CDP and the input/output channels. The program can exercise control over the MIC by use of a command herein called a descriptor transfer order.

The MIC processes memory access requests from the CDP and the data transfer module and also from the program interrupt logic circuitry, which is part of the MIC. The memory access processing consists of resolving access conflicts, generating and transmitting "wait" signals to the accessing unit if the memory is busy, and sending the timing and address signals to the memory when the memory is free.

Another capability of the module interface control (MIC) 9–18 is data routing. The MIC executes data transfers between the functional modules and sub-modules. When data is to be routed to memory for storage therein, it is transferred to the memory via a memory data multiplex means. During this exchange, data is transferred as a 25-bit word, including the parity check bit. Data may also be transferred to the memory from the CDP and the I/O units. A memory access control makes the data source selection.

The data routing capabilities of the MIC also includes control of data flow to the CDP, 9–10. The data source during this operation may be the memory, one of the input units or the interrupt circuitry and source selection is by program command.

Data flow is also directed by the MIC via the peripheral interface control means 9–16 to the I/O channels and sub-modules, from the memory and the CDP. During the data and descriptors transfers to the I/O logic, the MIC inhibits the data paths to the CDP and memory and permits the data or descriptor to be transferred to the addressed channel. Buffered I/O channels using memory locations for data and descriptor storage, receive output data and descriptors directly from memory.

As illustrated in the co-pending application U.S. S.N. 527,322, the MIC 9–18 is used for program interruption. The interrupt logic recognizes the existence of a condition requiring a program deviation and generates the control signals interrupting the program sequence then in progress. It thereafter refers the processor (CDP) to a memory location containing the initial step of the interrupt servicing routine. All but two of the interrupts can be masked out by the program, however, a record is kept of all interrupts that have occurred including those which have been masked out. The interrupt record may be examined by the program. Both of the interrupts that cannot be masked out are fault conditions. They are the command parity error and real time error. The interrupt mask is contained in the mask register and is preset by program command.

In addition to the interconnection to the bottom of

MIC, 9–18 from the unbuffered I/O channel 9–20, there is a second connection for intercommunication with the operators' console to provide auxiliary data and control. The MIC interfaces directly with the console to provide controls and data transfers for troubleshooting and program checkout procedures. The controls include start and stop, select start and stop addresses, single step, recycle, enable halt, and enter data. Data transfers permit storing of single words in specified memory locations and displaying the contents of specified memory locations or registers by the console indicators.

A final feature of the MIC is to provide capability of a particularly desirable loading operation herein called the bootstrap load operation. The bootstrap load operation permits the loading of programs and constants anywhere in memory without the memory containing a load program. Number of words to be stored and the locations are not predetermined, but are part of the information transferred from tape to the computer. Two types of information are transferred during the bootstrap operation. They are: (1) memory address presets and (2) words to be stored in memory. When an address has been preset, data is loaded into memory sequentially starting with the preset address and continuing sequentially until either a new address preset is received or loading is completed. After a word has been stored in memory, it is read back and transferred to the console where it is given another check, called an echo check.

The unbuffered I/O channel 9–20 provides for input and output data transfers under direct program control. Each 24-bit data transfer requires at least one programmed instruction. The unbuffered channel is used for the interface with the tape controller and the printer. In addition, it also provides the interface for the operators' console and the transfer of primary data and control.

A control descriptor transfer command is used for specifying the peripheral device. If the channel is free, a descriptor denoting the device (device descriptor) is accepted and the data path to the selected device is enabled. If the channel is busy, the device descriptor is not accepted and a busy signal is sent to the CDP 9–10 where it can be interrogated by the program.

The unbuffered channel 9–20 includes the controller logic for the tape, printer, and the console. The channel becomes free after the output data has been transferred to the specified controller and hence does not have to wait until the peripheral device has accepted the data.

The data transfer module (DTM) 9–22 is made up of the following two sub-modules: the low-speed channel scanner (LCS) 9–24 and the data link controller (DLC) 9–26. The DTM 9–22 communicates with the CDP 9–10 and the memory modules 9–12, 9–14 via the MIC 9–18. If both the LCS 9–24 and DLC 9–26 request access to the memory at the same time, the DLC has priority over the LCS.

The LCS 9–24 sub-module controls the servicing of the low-speed communication channels and transfers the data bits between allocated memory and the active channels. The DLC 9–26 sub-module accepts data from the data link, performs an error check, and stores the received data in specified memory locations. Output data is read by the DLC from memory 9–12, 9–14 and transferred bit-by-bit to the data link together with the automatically generated error check bits.

The low-speed channel scanner (LCS) sub-module 9–24 is capable of servicing up to 256 duplexed TTY channels. The LCS takes the output data from memory and transfers the data bit-by-bit to the teletype (TTY) transmitter/receiver sub-modules as requests are received. Input data is received in a bit-by-bit fashion and six bit characters are assembled in memory. When a complete six bit character has been received, a flip-flop is set (also called a flag signal or merely a flag) which causes the program to accept the received character.

Two descriptor words are in memory for the transmit operation. They are correspondingly designated transmit character descriptors 1 and 2 (TCD1 and TCD2). TCD1 contains transmit character ready indicator, a character length indicator, and the transmit character indicator. TCD2 contains the character to be transmitted and the character length.

The transmitter/receiver sub-modules are organized into eight groups of 32 duplex channels each, hence the scanner services the output channels, 32 at a time. When the scanner recognizes that a 32 channel group requires the next bit, the scanner sequences through the memory locations containing the descriptor corresponding to the channels belonging to the group to be serviced. TCD2 is read from memory and bit position 11 is examined. If bit 11 contains a one, bit 23 is transferred to the transmitter logic, the word taken from memory is shifted right one place and stored back in memory. The scanner then reads the memory location corresponding to the next channel. If, upon reading TCD2, bit 11 is found to contain a zero, the scanner reads TCD1. Bit $\phi$ of TCD1 is examined and if it contains a one, no further action is taken, and the scanner proceeds to the next channel. If bit $\phi$ contains a zero, it is replaced by a one and returned to memory. TCD1, which is still in the processing register, is shifted right one position at the same time as bit 23 is transferred to the transmitter. The descriptor is then stored in the memory location containing TCD2 thereby making up the new descriptor. The scanner now goes to the next line. After servicing all 32 output channels the scanner examines the 32 input channels belonging to the same group and after completing the input service, goes to the output lines of the next group. Servicing an output line requires two memory cycles (6 $\mu$sec.) if TCD2 only is needed. If TCD1 has to read from memory also, the servicing time requires three memory cycles plus three access times (9 $\mu$sec.). Hence, to service 32 output lines requires from 192 $\mu$sec. to 288 $\mu$sec. Since a 32 channel group operates on a common frequency, the 32 output lines are serviced as a block and individual scanning is not required.

Similarly, two descriptor words are stored in memory for the receive operation—receive character descriptor 1 (RCD1) and receive character descriptor 2 (RCD2). RCD1 is used to assemble the character being received. RCD2 is a buffer which receives the completed character for use by the program. The program must extract the character stored in RCD2 before a new character has been completed. The scanner examines the input lines and if a flag signal is recognized the line must be serviced. The corresponding descriptor RCD1 is read from memory. The received bit is entered into bit position 15 of RCD1 at the same time as a right shift is executed. Bit position $\phi$ through 8 of RCD1 execute a circular shift with bit 8 entering bit position $\phi$. If after completion of the shift bit $\phi$ contains a one, a complete character has been received and is now right adjusted. After completion of the right adjust the new character is stored in the memory location reserved for RCD2. If at the time a complete character is received the echo control bit (bit 14 of RCD1)is a one the echo mode is entered; otherwise, the echo mode flip-flop is reset.

Servicing an input line requires two memory cycles plus two access times (6 $\mu$sec.) if a character is incomplete. If a character is completed, an additional memory cycle is required for storing the completed character in the RCD2 location, and some additional time is required for the right adjust operation.

Figure 10:
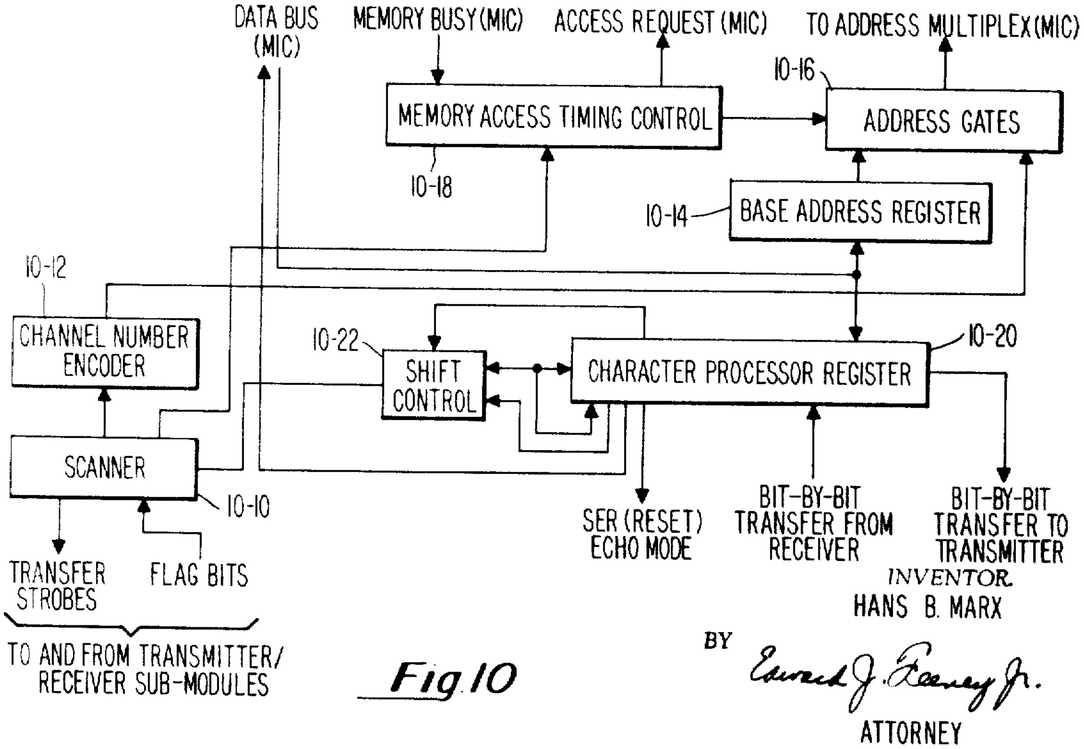
FIGURE 10 is a more detailed block diagram of the low speed channel scanner illustrated generally in FIGURE 9.

A functional block diagram of the low-speed channel scanner is shown in FIGURE 10. The logic of the scanner 10–10 continuously interrogates the flag bits from transmitter/receiver sub-modules. When the scanner 10–10 recognizes that a bit is wanted for transmission or conversely a bit has been received and is ready to be stored, the corresponding channel number is encoded by channel number encoder 10–12. The contents of the encoder 10–12 and the program preset base address register 10–14 make up the address 10–16 of the appropriate character descriptor location in memory. If the memory is free an access request is generated from the timing control 10–18 and the character description is read from memory. The character descriptor is transferred to the character processor register 10–20 and if a bit is to be transmitted or received, the appropriate transfer strobe is sent by the scanner 10–10 to the active channel in the transmitter/receiver sub-module. Control is then turned over to the logical circuitry of the shift control 10–22 which steps through the indicated operations. After the character has been processed, in register 10–20, and the descriptor has been restored to memory, control returns to the scanner 10–10 which now proceeds to the next line. The base address register 10–14 is preset by the program using a descriptor transfer command.

The data link controller sub-module contains the logic for receiving and transmitting messages via the data link at 1.2, 2.4 or 4.8 kc. bit rate. To permit simultaneous receiving and transmitting, the receiving and transmitting controller logic are separately shown in FIGURES 11 and 12 respectively. Also included in the controller logic is error checking and error check cycle generation.

Figure 11:
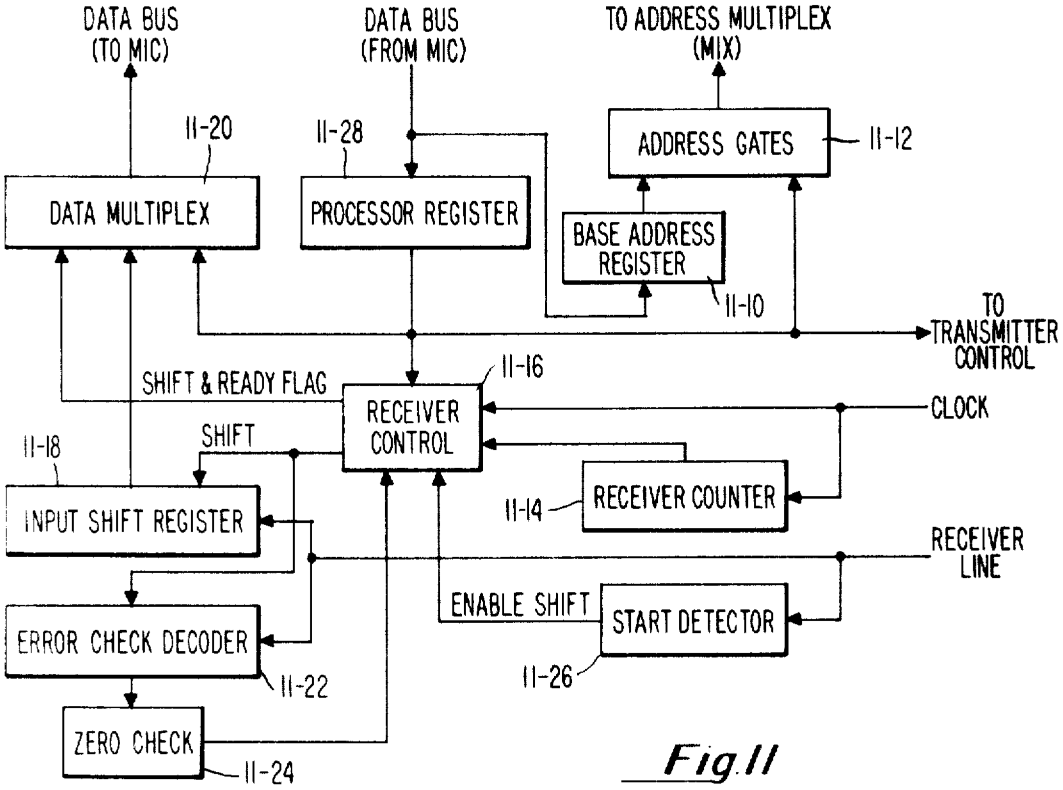
FIGURE 11 is a block diagram of the data link receiver controller also illustrated in FIGURE 9.

Consider first FIGURE 11 during a receiving operation in which messages are accumulated in memory. The memory contains a descriptor word, the receive message descriptor (RMD), which specifies the number of 24-bit words in the message. When a 24-bit word is received, this descriptor is taken from memory and the word count contained therein is used to modify the address already contained in the base address register 11–10. The generated address through gates 11–12 indicates the memory location which is to receive the newly entered 24-bit word. The word counter 11–14 is then stepped and the descriptor is returned to memory. When the word count indicates the end of the message, the message ready bit is set in the description word by receiver control 11–16. At the same time, the error check is performed by the error decoder 11–22 and if an error is indicated by zero check 11–24, the error flag is set by receiver control 11–16. Thereafter, the descriptor as changed is returned to memory.

Figure 12:
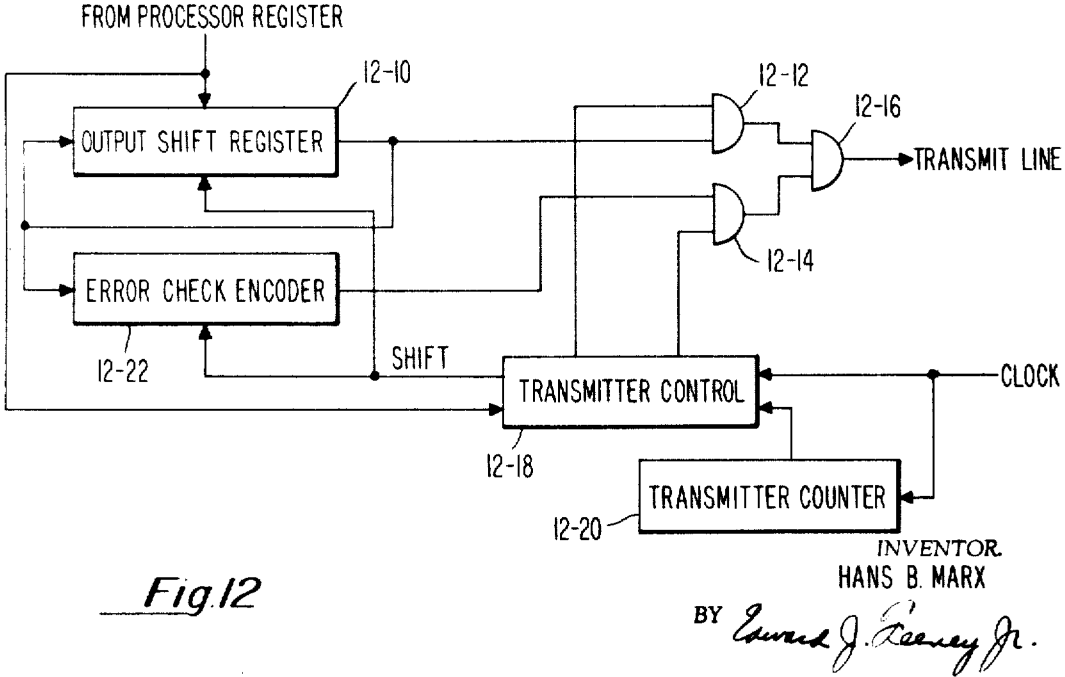
FIGURE 12 is a block diagram of the data link transmitter controller similarly shown in a general manner in FIGURE 9.

Messages to be transmitted are stored in the memory until the transmitter control logic of FIGURE 12 is activated. Asssociated with the output message is the transmit message descriptor (TMD). When the flag signal indicates that a new word is needed, the memory is accessed and the descriptor TMD is read from memory. Similarly, as in a receiver operation, the word count contained therein is used to modify the content of the base address register 11–10 to make up the address of the momory location containing the next word to be transmitted. The word count 12–20 is stepped and the descriptor returned to memory. If the word count indicates that the message is complete, the message complete bit is set in the descriptor before the descriptor is returned to memory. At that time, a flip-flop is set in control 12–18 which permits the transmission of the error checking code from encoder 12–22 as soon as the last word of the message is placed on the transmit line 12–16.

The low-speed communication controller (LCC) module generally referred to in FIGURE 9 as 9–28 contains the transmitter/receiver sub-modules. Each module consists of two sub-modules. A sub-module is made up of a group of 32 duplexed channels, thus each module has two groups of channels. The channels of a group operate all at the same frequency. The two groups contained in an LCC module may, however, operate at different frequencies.

Figure 13:
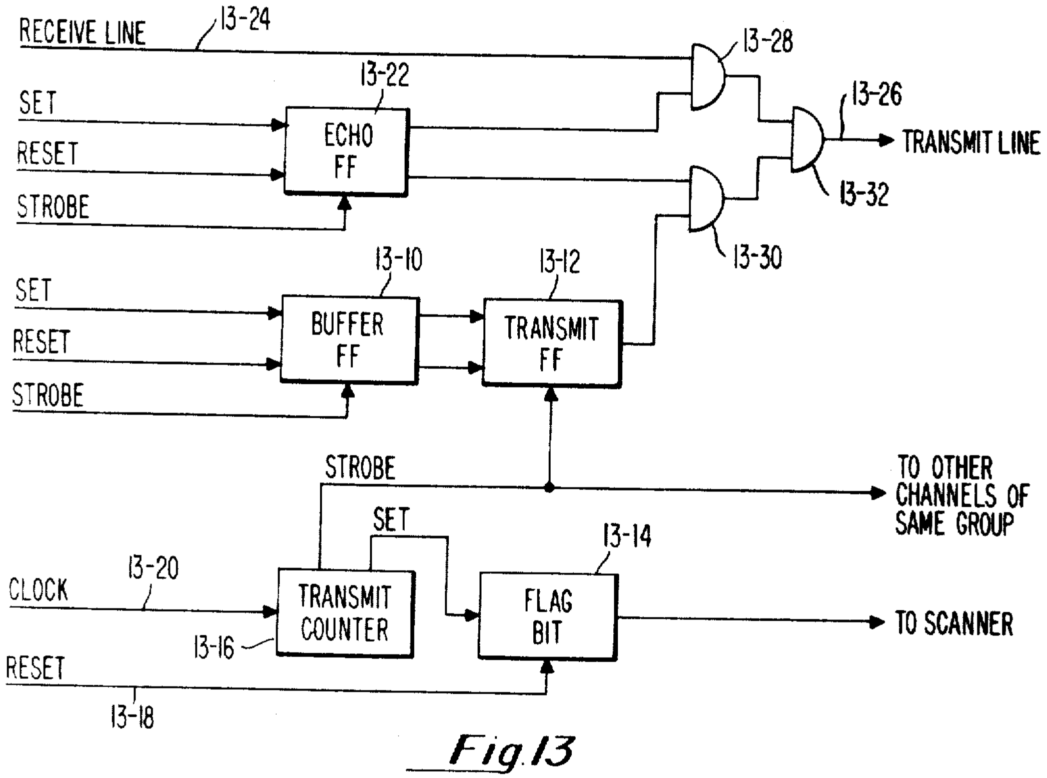
FIGURE 13 is a block diagram of the transmitting channel.

A block diagram of the transmitter logic in an LCC module is shown in FIGURE 13. A bit received from the scanner 9–24 shown in FIGURE 9 and is placed into the transmit buffer flip-flop. The bit is held there until a new bit has to be transmitted. The bit is then transferred to the transmit flip-flop 13–12. The buffer flip-flop 13–10 is not, however, reset at this time. As soon as the bit has been transferred to the transmit flip-flop 13–12 the flag bit 13–14 is set by the counter 13–16 permitting the next bit to be inserted into the buffer flip-flop 13–10. The flag bit is reset 13–18 when the buffer flip-flop 13–10 has received the new bit.

The operation of the transmitter logic is controlled by the transmit counter 13–16 which is stepped by clock pulses 13–20 occurring at a frequency of eight times the transmission frequency. Only one transmit counter 13–16 is needed for a group of 32 output channels. The buffer flip-flops 13–10 of the 32 channels receive their appropriate bits in sequence. The transfer of the bits to the transmit flip-flop 13–12 occurs simultaneously for all 32 lines. Hence, only one flag bit 13–14 is needed for a group of 32 lines.

An echo flip-flop 13–22 is used to recycle information. If the echo flip-flop is set, the receive line 13–24 becomes the input to the transmit line 13–26.

Figure 14:
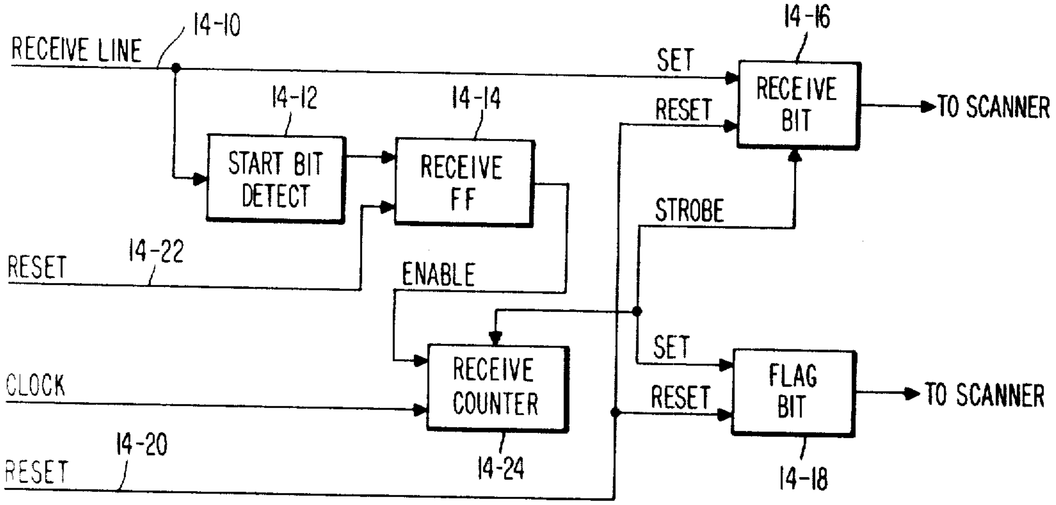
FIGURE 14 is a similar block diagram of the receiver channel.

A block diagram of the receiver logic of the LCC module is shown in FIGURE 14. The receive line 14–10 is an input to the start bit detector 14–12. When a start bit has been recognized, the receive flip-flop is set, permitting bits to be received. When a bit has been received it is temporarily stored in the receive flip-flop 14–14 until the scanner is ready to accept the bit. At the time the bit is placed in a buffer flip-flop 14–16 a flag bit 14–18 is set indicating to the scanner that a new bit is ready for transfer to memory. Both the flag 14–18 and the buffer 14–16 flip-flops are reset 14–20 as soon as the bit has been transferred to the scanner. The receive flip-flop 14–14 is reset by a signal on reset line 14–22 from the scanner after a complete character has been received.

The present data processing system contains a number of circuits which are used for automatic error detection. The detection of an error causes a program interrupt to be executed and program control to be transferred to a predetermined memory location. It also causes a control bit to set which can be examined by the program. Error interrupts can be inhibited by the program by setting the appropriate bits in the interrupt mark.

Figure 15:
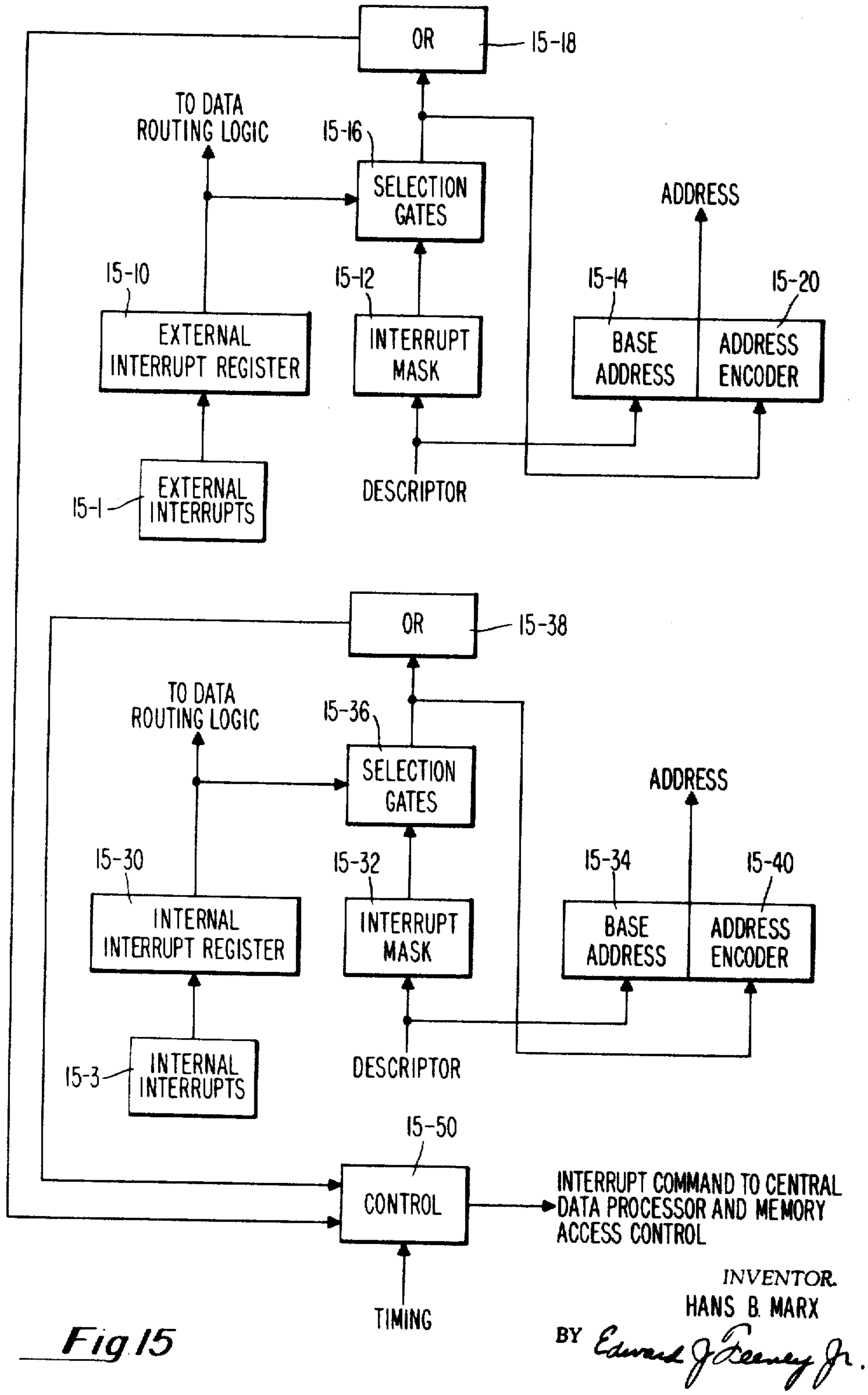
FIGURE 15 is a logical block diagram of the interrupt system used in all of the embodiments illustrated in the accompanying drawings.

The following error control bits may be tested by the program:

RTE—Real-time error
OVE—Overflow error
DPE—Data parity error
CPE—Command parity error
IPE—Input parity error This interrupt system is illustrated in FIGURE 15. As shown it provides for two types of interrupt signal, external interrupts 15–1 and internal interrupts 15–3. Although both types are handled substantially the same, they are separately executed by their own circuitry. The error interrupts and a programmed interrupt are included among the internal interrupts. The program maintains complete control over the interrupt. A specific interrupt may be processed immediately, delayed or ignored.

There is a separate internal and external interrupt register 15–30, 15–10 each of which contains an individual bit corresponding to each of the individual interrupt signals. Further, each interrupt type possesses a separate mask register 15–32, 15–12. Corresponding to each interrupt signal is an interrupt mask bit, which may be preset by the program. If a specific mask bit is set, the corresponding interrupt signal bit is inhibited by selection gates, 15–16, 15–36. A record, available to the program for interrogation, is kept of all interrupt signals which occur, including those masked out. When a permitted interrupt occurs, it is passed through one or the other of the OR gates 15–38, 15–18 to the control circuit 15–50 from which access is requested to a memory module previously identified by the program. When access is granted, the content of the address register including the base address 15–34,

15–14 and the address encoder 15–40, 15–20 is sent to the identified module. This is the initial step in the interrupt servicing routine. The content of the program counter is stored in memory and the program counter is preset to fetch the second step of the interrupt service routine. Interrupt servicing is now returned to program control.

It is not considered necessary to list herein the basic commands that make up the computer order codes, nor for that matter, even the more important command variations available, since they form no part of the present invention description nor its claims. Of course the commands for this system are included in the co-pending applications directed to the CDP modules, previously referred to and specified. However, it should be noted that in all cases where command variations are determined by the address field of the instruction word, the effective address is used, that is, the effective address is the instruction word address field as modified by the content of the index register, if indexing was indicated.

As previously noted, the basic memory module for the computer system is a 4096 word, 25-bit DRO memory, used for program and data storage. This memory module includes not only the memory stack and all circuits required for reading and writing, as previously described, but also includes the address decoding matrices, required to decipher the encoded address information transferred from the interrupt address register encoding portions, 15–40, 15–20.

The particular memory module is selected through a scheme of modular addressing which permits the expansion of the system memory size without a corresponding lengthening of the instruction word address field. Since each instruction provides a 12-bit address field, the system memory may be expanded in steps of 4096-word modules, each memory module being designated by a module number. The computer program can operate with any two modules at a given time by designating one memory module as the primary module and another as the secondary module. The memory selection bit (bit 11 of the instruction word) determines which of the two selected memory modules is addressed by the field. Thus, if bit 11=0, the primary module is being referenced by the instruction. The module designation can be changed under program control by the control descriptor transfer command. The control descriptor, specifies by memory module number, which module is primary and which is secondary. Modular addressing is used only for data storage.

A computer configuration using one CDP can operate with up to eight 4096-word memory modules. To further increase the memory capacity, a memory bank system is employed. Each memory bank may consist of up to 32,768 words of memory, organized into eight 4096-word memory modules. A descriptor is used to determine to which memory bank the modular addressing applies. One or two memory banks may be selected at a given time. If two banks are selected, one of the modules addressed is in one bank, and the second module must be in the alternate bank. The memory bank system requires the module interface control (MIC) previously described.

To achieve the flexibility and speed desirable for the computer, it is necessary to have a memory that permits high-speed operation. The present design uses a memory access time of less than the basic clock time. Since the basic clock time for this computer is one microsecond, the memory access time must be less than one microsecond. The sense amplifier outputs are used to set the data input register flip-flops. The flip-flops are of the leading edge type with the "set" side unlocked. The transfer of data from the memory to the memory output register must be completed in approximately one microsecond, the time being measured from the completion of the decoding of the memory address.

The time required for the computer to execute store instructions is 8 microseconds with a 4 microsecond memory since a store (write) operations is always preceded by a read operation.

Figure 16:
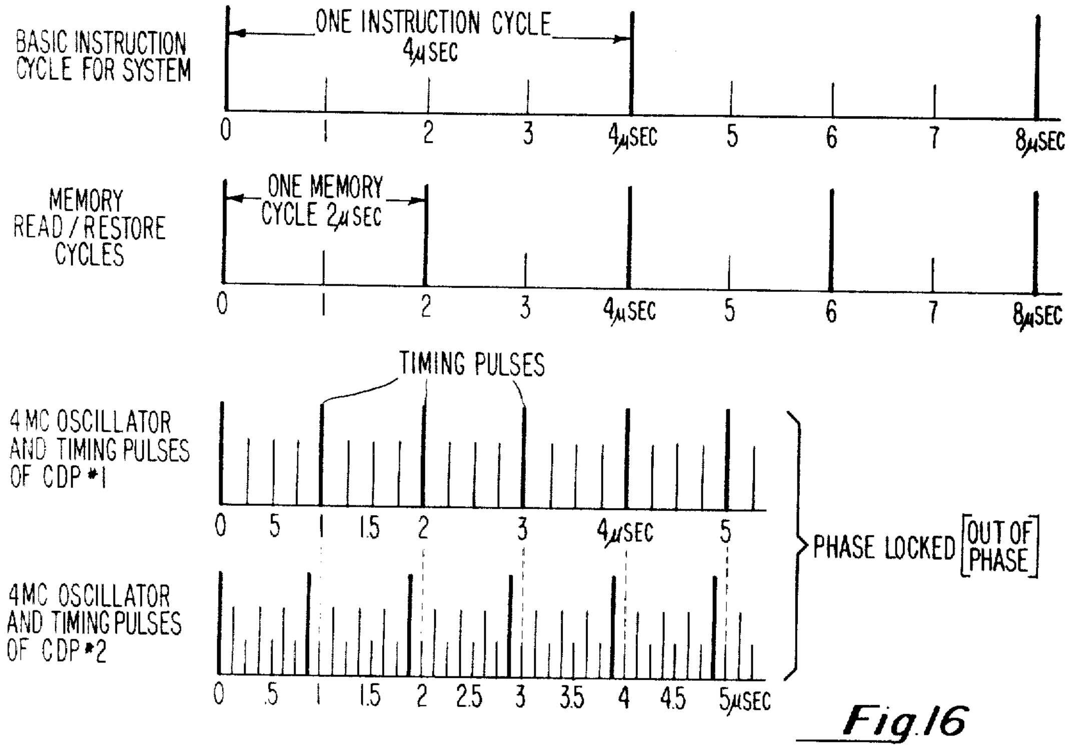
FIGURE 16 is a timing signal representation showing the alternate access signals of a two processor system.

A number of system timing diagrams are illustrated in FIGURE 16. As shown in the top diagram, the basic instruction cycle for the system is four μsecs. However, several instructions which do not require memory access for data have a shortened cycle of only three μsecs. The basic clock pulse signal has a repetition rate of one megacycle and consequently, repetitive pulses occur every microsecond. Any number of pulse times may be added to the basic instruction cycle, to obtain the number of pulse times required to execute a given command. As shown in the third diagram, the timing pulses are derived from a 4 megacycle per second oscillator. Each central data processing module (CDP) in the multi-processor system has its own 4 megacycle oscillator. When both processing modules (CDP#1 and 2) in the system are in operation, the two oscillators are phase-locked, but are out of phase. This structure simplifies the solution of memory access conflicts. If one of the processing modules is removed for any reason the oscillator clock of the other processing module becomes free running.

The present memory used by the stytem is a 2 μsec. read/restore cycle, destructive read-out, core-storage device. This is illustrated in the second timing diagram of FIGURE 16. The memory word length is 26 bits: 24 bits are data, one bit is a parity check bit, and the remaining bit is a guard bit. Memory operation may be in a read/restore mode or read/clear mode. Access time is less than one μsec., as previously noted and each memory module contains 4096 addressible words.

In the read/restore mode of operation, information from the memory data register is re-entered to the cores by energizing the X and Y write current regulators, following application of an inhibit current to those bits which are to remain ZERO. In the clear-write mode, external information is presented to the memory data register prior to the application of the inhibit and write currents.

The memory receives data, clock and address information from the module interface control. If the memory is busy, a signal is sent to the MIC inhibiting the memory access. The inhibit signal is removed when the two μsec. read/restore cycle is completed. In the multi-processor configuration, a memory may be accessed from either of the two MIC's. While it is not shown, each memory module contains part of the memory cross-point switch and the remaining cross-point switch logic is in the MIC's. Access conflicts are resolved by the MIC's. The executive program can lock-out access to a specific memory module by any one of the MIC's.

The guard bit prevents writing into memory loations that have the guard bit in the ONE state. However, the guard bit write inhibit may be overridden by the executive program.

The memory may be addressed by the central data processor (CDP) or by one of the buffered input-output channels. Instruction words are addressed by the program counter, which is a part of the CDP. The program counter may address any memory word in any momory module. The program determines the memory locations to be directly addressed by the buffered channels. The program may specify any desired buffer size up to the full memory capability.

For fetching data from memory, a modular addressing scheme is used. The modular addressing technique permits an expansion of the memory size without corresponding lengthening of the instruction word address field, which is restricted to 12 bits. The memory may be expanded in steps of 4096 words. The program can operate with any two sets of 4096 words of memory by designating one set of 4096 words a binary ZERO and the other as a binary ONE. This description uses a primary and secondary connotation for this designation. For a single processor computer configuration, the primary and secondary memory module designation is a function of the CDP, whereas in a multi-processor configuration, this function is performed by the MIC, under executive program control.

Modular addressing does not apply to address modification by indexing registers, nor to indirect address for single processor configurations. Address modifications and indirect addressing permit the program to fetch data from anywhere in memory. In a multi-processor configuration, this capability is restricted, and the memory modules that may be accessed by indexing and indirect addressing are predetermined by the executive program.

The module interface control logic controls the flow of data between the central data processors, memories and input-output; resolves memory access conflicts; contains the program interrupt logic; and contains the charactor call-out logic.

If more than one unit is permitted access to a particular memory unit, access conflicts may arise. A scheme which significantly reduces the occurrence of such conflicts is illustrated in FIGURE 16. However, when such a conflict does occur, the MIC control logic generates a "wait" signal which holds up (delays) one of the accessing units for one memory cycle time, illustrated in the second timing diagram. However, access to a memory unit can always be achieved within an instruction cycle period of 4 microseconds. This timing diagram is shown in FIGURE 16.

Referring in particular to the bottom two timing diagrams shown on FIGURE 16 there is illustrated therein the feature which substantially minimizes the degree of conflict between a first and a second processing module when they are connected for concurrent processing in a multi-computing system. Each processing module CDP#1 and CDP 2 has a separate high frequency oscillator. However, both have the same frequency of oscillation. Thus, in the present configuration, both are 4 megacycle oscillators. Since, as previously mentioned, the system clock frequency is 1 megacycle, only one of every four cycles is used as a timing pulse. Since, further, it is imperative that the system have some degree of overall synchronization between its separate portions, there must exist some form of phase locking means between the first and second oscillators. Usually this is done by the straightforward expedient of phase locking the timing pulse in an in-phase relationship. However, it is readily seen that when the two timing signals coincide, two requests for access might also coincide. At least the basic ingredients of coincidence is there.

This coincidence is considerably reduced by the unique scheme of phase locking the high frequency oscillators out of phase. In this way, not only does one signal consistently lag (or lead) the other such as to reduce the degree of coincidence, but by locking the high frequency oscillator rather than the lower frequency timing signal, the time lag (or lead) is reduced toward the point of insignificance. For example, the degree of separation in the present illustration is 125 nanoseconds, whereas were the timing signals phase locked the separation would be 500 nanoseconds. This out of phase locking scheme of a pair of high frequency oscillators (4 mc.) to provide a synchronized pair of one megacycle timing pulses separated by 125 nanoseconds is dynamically illustrated in FIGURE 16.

In summary, the module interface control provides the interface between the various modules that make up the processing system. It may be part of an interface control module or it may require a module by itself. Data flow between the modules and the program interrupts are controlled by the MIC. In addition, the MIC includes the memory and I/O bus allocation logic for computer systems requiring concurrent memory access and for multiprocessing configurations.

The MIC receives data, memory addresses and control signals from the CDP, the PIC (peripheral interface control), and the memory. It also distributes data, addresses and controls to these locations. Data and control words from the CDP are received via a 25-bit data bus (including a parity bit) which is the output from the data output multiplex (DOM) in the CDP. These data and control words are then routed to the appropriate transfer paths or controls as determined by the associated control signals. Address words received from the CDP are routed directly to the memory if no concurrent access is implemented. Otherwise, the address and the memory read or write request is routed to the bus allocation logic. Similarly, data and addresses received from the I/O module are transferred to the CDP input multiplex or the bus allocation logic. Data coming from the memory is routed to the CDP input multiplex or to the specified I/O channel.

The interrupt control logic includes the interrupt register and the interrupt mask register. The interrupt mask register is preset by the program. The interrupt register keeps a record of the interrupts that have occured. The program may reset the interrupt register, sample and reset, or transfer the content to a memory location for delayed interrupt receiving.

The bus allocation logic or the MIC provides the capability of concurrent memory access by more than one unit making up the computer complex. The memory bus allocation is under program control. The program establishes a transfer path between an I/O channel and a designated memory module, between the CDP and a number of memory modules. If a bus is assigned to more than one functional unit, access time sharing is required, with the I/O channel having access priority. The program uses a descriptor transfer command to assign a memory bus to the buffered I/O channel or to the CDP. The descriptor contains the module identification and the memory module number or numbers. Bus allocation assignments may be made individually. It requires one descriptor transfer command for each assignment or requirement. The descriptors preset the memory bus assignment storage register (shown in FIGURE 6) and the output from this register is a number of gating signals which selectively connect memory busses and the CDP and I/O busses. This function is performed by the switch logic network, which consists of a number of transfer gates. Thus, the function of the MIC is to compatibly interface the system with a plurality of memory types or configurations. The transfer gates accomplish the transfer of address words, control signals, and data between the memory and the accessing units. If a memory module is permitted to be accessed by more than one unit, an access conflict may arise. If a memory module is busy when an access request occurs, a "wait" signal is transmitted to the requesting functional unit, which is then held up until the memory cycle in progress has been completed.

The PIC portion of the interface control module provides the interface between the computer and the peripheral devices. The completely modular design of the present computer system makes it feasible to design the input/output logic to satisfy specific computer applications and configurations. Thus, the peripheral interface control (PIC) may be either general purpose or special purpose. A general purpose control consists of a number of buffered and unbuffered I/O channels, which interface with each other, special purpose controls, or directly with peripheral devices. Since many of the possible system applications are special purpose, this custom design approach makes it possible for the potential user to include only those input-output capabilities required in the system, thus excluding unessential circuits.

The function of the PIC is therefore to interface with the peripheral equipment of a specific system configuration, and to perform specialized tasks such as are involved in radar data processing, communication processing, display undating command control, data base management, and similar applications. Specialized peripheral interface controls may also function as controller for disk files or magnetic tape units. A particular system configuration may include more than one such control.

The general purpose interface control module may include a number of buffered and unbuffered I/O channels. Each I/O channel can be connected to a number of peripheral devices, the number of peripheral devices depending on the type of device and its data transfer rate. A buffered I/O operates with a buffer store which is part of the computer memory. The program makes the initial buffer store assignment, specifying location and buffer size and gives the buffered channel a "go-ahead" command. All data transfer are then made automatically without further program intervention until the assigned buffer space has been used up. Data transfers into and out if memory is on a memory access sharing basis of no concurrent memory access is implemented. Concurrent memory access permits a higher rate of data transfer, the rate being limited only by the memory cycle time.

Unbuffered channels are under complete program control. Each data transfer requires a programmed instruction. Data transfers may be either from or to memory, or from or to an arithmetic register.

Finally, the program has a number of instructions available for executing I/O control and for data transfers. Channel selection and device designations are made by use of the command descriptors. A 12-bit descriptor and a 24-bit descriptor are generally used for the buffer storage assignment, with the 12-bit descriptor divided into two fields, a 6-bit control field and a 6-bit device selection field.

Although there has been shown and described only certain specific computer operations and inter-connections, it will be apparent that many more operations and inter-connections are possible without departing from the spirit of the present invention. Therefore this invention is not to be limited except insofar as is indicated by the purview of the disclosure itself.

What is claimed is:

1. A modular data processing system comprising a plurality of functional system modules and a plurality of input/output peripheral devices, said plurality of functional system modules including at least one central data processing module, a plurality of memory modules of various types and configurations and at least one interface control module, each of the interface control modules being respectively connected to each of the remaining plurality of functional system modules and to each of the plurality of input/output peripheral devices and each of said interface control modules including means to simultaneously supply and to concurrently control a plurality of parallel paths of intermodular communication between said functional system modules and a plurality of parallel paths of input/output communication between said functional system modules and said plurality of peripheral devices.

2. The modular data processing system as set forth in claim 1 wherein said plurality of memory modules includes a first and a second type of memory module, said first type being comprised of magnetic core storage elements and said second type comprised of magnetic thin film storage elements.

3. The modular data processing system as set forth in claim 2 wherein the respective storage elements of said first and said second type of memory module includes a first class having destructive read-out characteristics and a second class having non-destructive read-out characteristics.

4. A modular data processing system including a plurality of modular memory means, a modular processing means, a plurality of peripheral devices and at least one interface control module, said control module comprising: a module interface control means respectively connected to said modular memory and to said modular processing means for respective bidirectional communication therewith, and a peripheral interface control means connected between said module interface control means and said plurality of peripheral devices to provide a plurality of bidirectional communication paths therebetween.

5. A modular data processing system as set forth in claim 4 wherein said modular processing means includes at least one central data processing module connected to each interface control module.

6. A modular data processing system comprising a plurality of functional system modules, including at least one data processing module, at least one interface control module connected thereto and at least two memory modules each connected to each of said interface control modules, each of said interface control modules comprising a module interface control means having a first bidirectional communicating means to receive information from and transmit information to said data processing module, a second bidirectional communicating means to transmit information to and receive requested information from said memory modules, and a memory modular addressing means connected between said first and said second bidirectional communicating means to receive memory address information from said data processing module and transmit said received address to a selected one of said memory modules.

7. The modular data processing system as set forth in claim 6, wherein said memory modular addressing means includes addressing control means connected to receive said memory address information from said data processing module and modify it for selective transmission to one of said memory modules.

8. The modular data processing system as set forth in claim 7, wherein said addressing control means includes means to receive said meomory address, means to respond thereto by designating a particular memory module address and further means to select such memory modules so designated.

9. The modular data processing system as set forth in claim 8 wherein, said means to select the designated memory module comprises a plurality of memory module allocating logical gating circuit means to provide the appropriate communication path to said selected memory module.

10. The modular data processing system as set forth in claim 9 wherein, the memory module allocating circuits are partially apportioned into a first and a second portion, said first portion centrally located in the module interface control means and said second portion individually located in each of said memory modules of the system.

11. A modular data processing system having two or more central data processing modules, two or more memory modules, and two or more interface control modules, each of said central data processing modules connected to one of said interface control modules and all of said interface control modules commonly coupled together for individual connection to each of said memory modules, each of said central data processing modules including a timing means to provide a clock signal and each of said interface control modules including a timing interlock control means respectively connected and responsive to said timing means to provide said system with a first and second timing signal synchronously interlocked in an out of phase relationship.

12. A modular data processing system as set forth in claim 11 wherein, said timing means of each of said processing modules includes a high frequency oscillator having an output signal whose frequency is substantially greater than the clock signal provided by said timing means.

13. A modular data processing system as set forth in claim 12 wherein, said high frequency oscillator in all of said processing modules has a corresponding frequency.

14. A modular data processing system as set forth in claim 11 wherein, the timing interlock control means included in each of said interface control modules is interconnected to enable system intercommunication therebetween and further wherein each timing interlock control means includes disconnecting means to discontinue the interlock control interconnection when only one of said timing means remains active.

15. A modular data processing system having a plurality of memory modules, one or more central data processing modules, one or more interface control modules, and a plurality of peripheral devices, each of said data processing modules connected to all of said plurality of memory modules through one of said interface control modules, and each of said data processing modules and all of said plurality of memory modules connected to all of said plurality of peripheral devices through the same one of said interface control modules, each of said interface control modules including means to provide a first plurality of input/output communication channels capable of direct, unbuffered intercommunication and a second plurality of input/output communication channels capable of indirect, unbuffered intercommunication.

16. A modular data processing system as set forth in claim 15 further including a plurality of external peripheral device interface control means and wherein each of said interface control modules includes a module interface control means, at least one internal peripheral device interface control means connected thereto and means for communicating with and controlling said plurality of external peripheral device interface control means.

17. A modular data processing system as set forth in claim 16 above wherein said at least one internal peripheral device interfaced control means and said plurality of external peripheral device interface control means are commonly coupled to communicate with and control said plurality of peripheral devices.

18. A modular data processing system having a plurality of central data processing modules, an equal plurality of interface control modules respectively connected thereto, a plurality of memory modules, each connected to said pluarlity of control modules and a plurality of peripheral devices each connected to at least one of said control modules, each of said control modules including means for interrupting the central data processing module to which it is respectively connected in response to interrupt signals initiated by said peripheral devices and said remaining control modules to thereby enable each of said central data processing modules to communicate with each of the remaining plurality of central data processing modules through a network of interrupt means.

19. A modular data processing system as set forth in claim 18 wherein each of said interface control modules includes both internal and external interrupting means for intermodular and intramodular communication with each of the central data processing modules of the system.

References Cited

UNITED STATES PATENTS

| | | | |
|---|---|---|---|
| Re.26,171 | 3/1967 | Falkoff | 340—172.5 |
| Re.26,087 | 9/1966 | Dunwell et al. | 340—172.5 |
| 3,214,739 | 10/1965 | Gountanis et al. | 340—172.5 |
| 3,200,380 | 8/1965 | MacDonald et al. | 340—172.5 |
| 3,181,121 | 4/1965 | Losch et al. | 340—147 |
| 3,056,110 | 9/1962 | Cypser et al. | 340—172.5 |
| 3,037,191 | 5/1962 | Crosby | 340—172.5 |
| 3,029,414 | 4/1962 | Schrimpf | 340—172.5 |
| 2,946,986 | 7/1960 | Harrison | 340—174 |
| 3,323,110 | 5/1967 | Oliari et al. | 340—172.5 |
| 3,323,109 | 5/1967 | Hecht et al. | 340—172.5 |
| 3,319,226 | 5/1967 | Mott et al. | 340—172.5 |
| 3,312,954 | 4/1967 | Bible et al. | 340—172.5 |
| 3,312,951 | 4/1967 | Hertz | 340—172.5 |
| 3,312,943 | 4/1967 | McKindles et al. | 340—172.5 |
| 3,307,152 | 2/1967 | Robbins | 340—172.5 |
| 3,305,839 | 2/1967 | Looschen et al. | 340—172.5 |
| 3,303,474 | 2/1967 | Moore et al. | 340—172.5 |
| 3,302,182 | 1/1967 | Lynch et al. | 340—172.5 |
| 3,297,996 | 1/1967 | Grady | 340—172.5 |
| 3,292,151 | 12/1966 | Barnes et al. | 340—172.5 |
| 3,287,703 | 11/1966 | Slotnick | 340—172.5 |
| 3,287,702 | 11/1966 | Borck, Jr. et al. | 340—172.5 |
| 3,263,219 | 7/1966 | Brun et al. | 340—172.5 |
| 3,247,488 | 4/1966 | Welsh et al. | 340—172.5 |
| 3,245,043 | 4/1966 | Gaffney, Jr. et al. | 340—172.5 |
| 3,242,467 | 3/1966 | Lamy | 340—172.5 |
| 3,229,260 | 1/1966 | Falkoff | 340—172.5 |
| 3,226,692 | 12/1965 | Fuller et al. | 340—172.5 |
| 3,223,976 | 12/1965 | Abbott et al. | 340—147 |
| 3,219,980 | 11/1965 | Griffith, et al. | 340—172.5 |

PAUL J. HENON, *Primary Examiner.*

GARETH SHAW, *Assistant Examiner.*